April 8, 1958

E. E. REYNOLDS 2,829,822

BINARY VALUE CALCULATOR

Filed Oct. 24, 1949

INVENTOR.
EUGENE E. REYNOLDS
BY
ATTORNEYS

April 8, 1958   E. E. REYNOLDS   2,829,822
BINARY VALUE CALCULATOR
Filed Oct. 24, 1949   10 Sheets-Sheet 4

INVENTOR.
EUGENE E. REYNOLDS
BY Naylor and Lavagne
ATTORNEYS

April 8, 1958     E. E. REYNOLDS     2,829,822
BINARY VALUE CALCULATOR
Filed Oct. 24, 1949                          10 Sheets-Sheet 5

INVENTOR.
EUGENE E. REYNOLDS
BY
ATTORNEYS

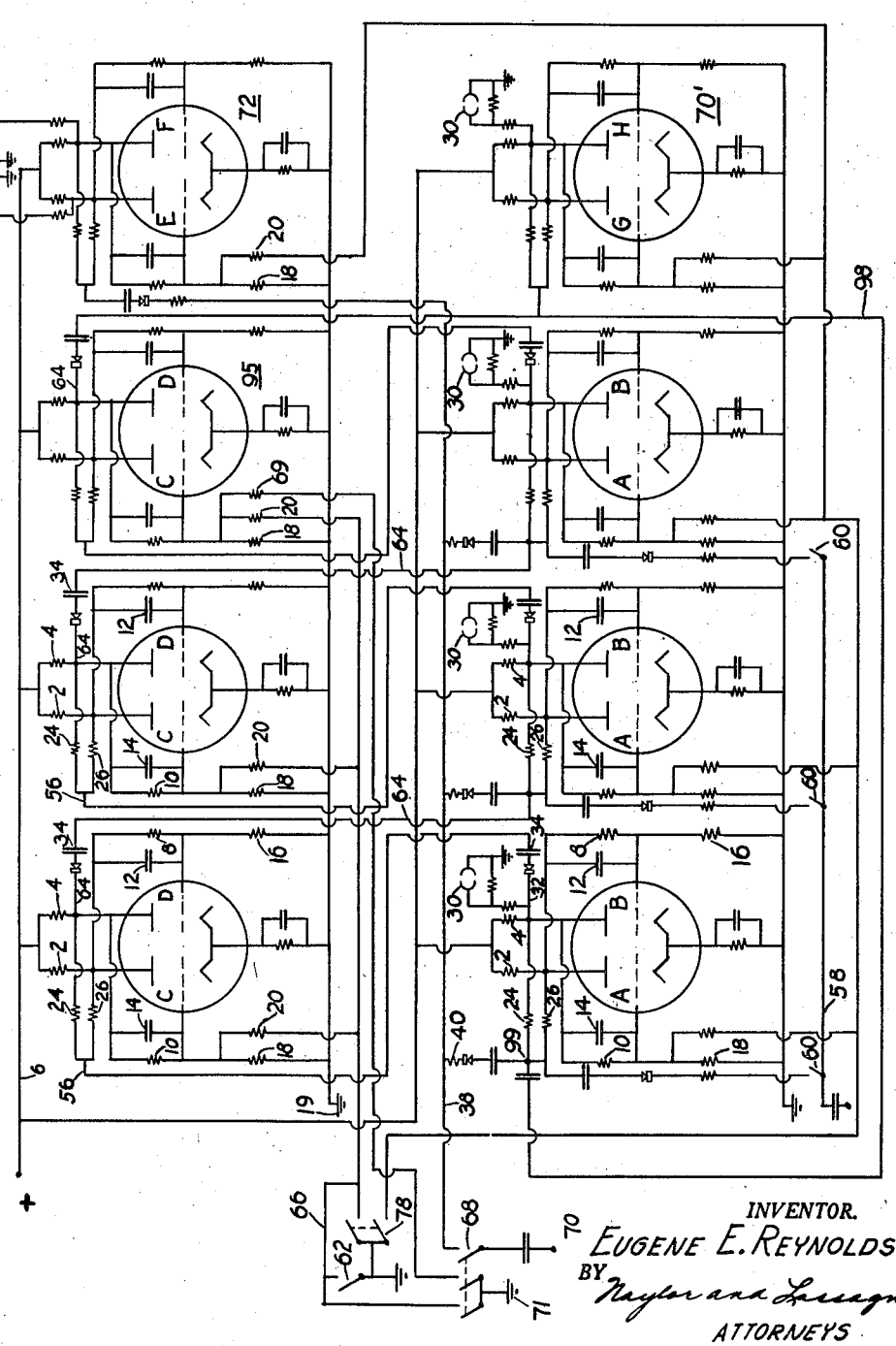

April 8, 1958     E. E. REYNOLDS     2,829,822
BINARY VALUE CALCULATOR
Filed Oct. 24, 1949     10 Sheets-Sheet 10

INVENTOR.
EUGENE E. REYNOLDS
BY
ATTORNEYS

United States Patent Office 2,829,822
Patented Apr. 8, 1958

2,829,822

BINARY VALUE CALCULATOR

Eugene E. Reynolds, Richmond, Calif., assignor to Marchant Calculators, Inc., a corporation of California Application October 24, 1949, Serial No. 123,232

32 Claims. (Cl. 235—61)

This invention relates to a calculating machine, and more particularly to a calculating machine adapted to receive binary input values, and so relate said input values as to perform selected mathematical steps in addition, subtraction, division and multiplication.

In my co-pending application, Serial No. 123,231, filed October 24, 1949, now Patent No. 2,713,456, granted July 19, 1955, there is disclosed and claimed a binary value translating machine adapted to additively receive binary input values, and relate said input values through sensing means, including sensing patterns, to indicating means, and thereby enable the indicating means to display the decimal value equivalents of any given summative binary value input. The present invention provides means which may be incorporated between the input value receiving means and the indicating means of my binary value translation machine, thereby enabling such selective correlation of various input binary values as to make possible the addition, subtraction, multiplication or division of said values, and the translation to a decimal value of the binary value solution of a particular problem.

In summary, the following may be stated to be within the scope, intendment and purpose of the present invention: the provision of a binary value counter, or accumulator operable selectively to perform either the addition of binary values or the subtraction of binary values; the provision of means interrelating such a selectively operable counter and one or more counters of the same or broadly similar type to provide for the division of a given binary input value by a given or selected binary value and the recordation of the quotient, or, reversely, to provide for the multiplication of a given binary input value by a given or selected binary value and the recordation of the product; to provide means for utilizing the "mirror-image" or partial complementary value of a value present in an additive carry-value type of counter or accumulator for the performance of subtraction, and thus avoid the problem presented by the so-called "fugitive 1"; the provision of a system for performing binary multiplication and division embodying means for relating values through off-set sensing pattern contacts; the provision of means in an additive or carry type of value counter or accumulator adapted to delay the input of carry values until simultaneous entry of ordinal values and to thereafter provide for simultaneous entry of the carry values; and the provision of adequate control means to make possible the efficient attainment of the foregoing.

These and other objects of the invention will be apparent from the description hereinafter presented when taken in conjunction with the drawings forming part of this specification, and in which:

Figure 8 is a partial elevational detail view of the sensing drum and pattern utilized in the performance of division and multiplication by the calculator machine;

Figure 18 is a circuit diagram of an electronic circuit embodying the basic circuits of Figure 16, adapted for simultaneous ordinal value entry and delayed carry value entry;

BINARY SUBTRACTION

Figure 1:
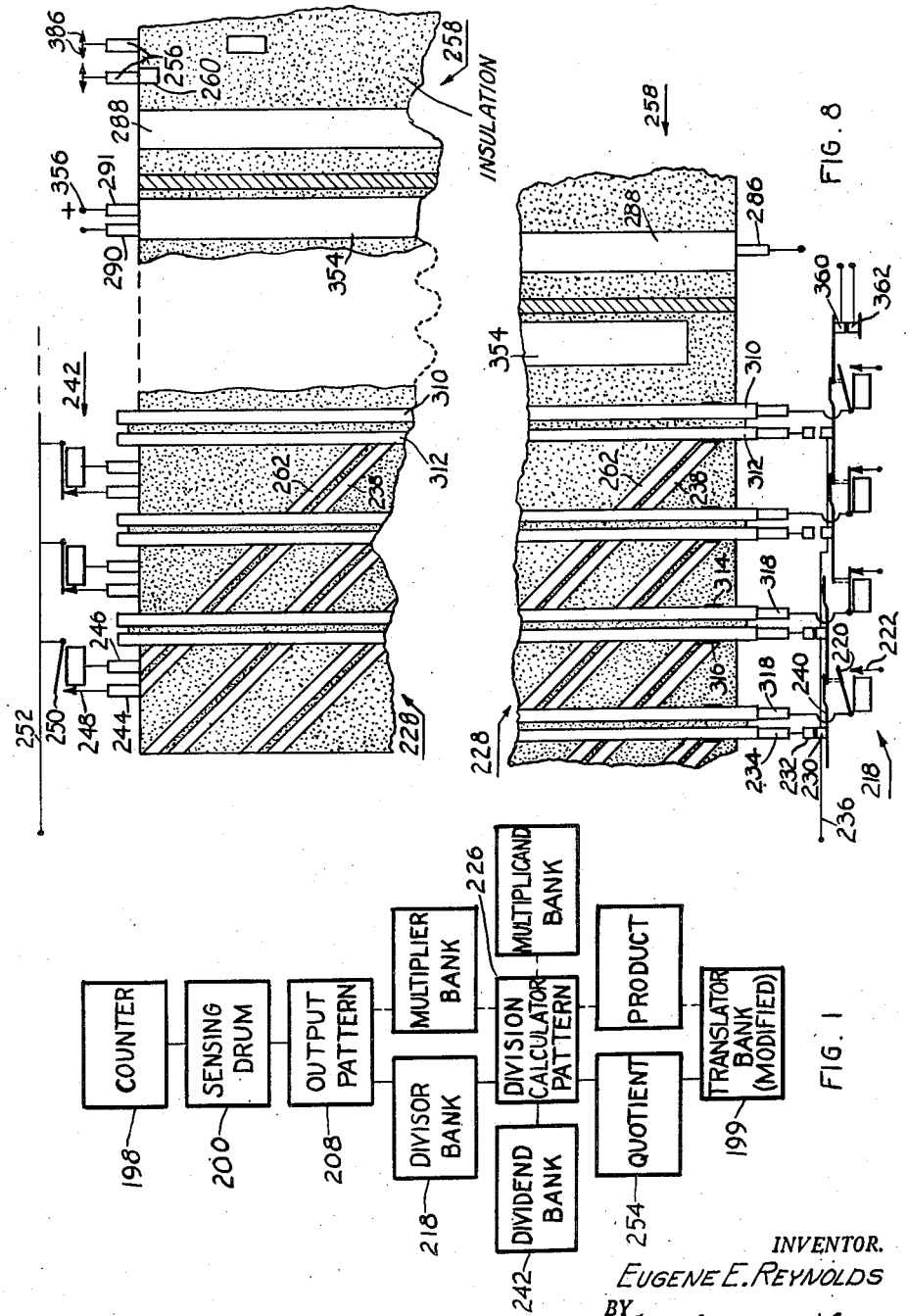
Figure 1 is a block diagram of the calculator of the present invention in the environment of the binary translator system of my previously mentioned co-pending application.

In a calculating machine having binary storage registers, each of which comprises a plurality of stages, or orders of electrical units such as relays or trigger pairs, the basic arithmetic operations are usually performed by entering additive or subtractive binary values into one or more of the registers. When a value is additively entered into a register which already contains a value, carries may occur in one or more orders; therefore, registes of this type are ordinarily provided with inter-order positive carry circuits comprising electrical connections from each order to the next higher order. Similarly, entry of a subtractive value, i. e., a subtrahend, may cause negative carries. But the positive carry connections are usually not adapted to performing negative carry; therefore it is necessary to provide separate circuits for performing the positive and negative carries, so that the complete register may be undesirably large and expensive.

One alternative to the provision of separate positive and negative carry circuits is the well-known expedient of entering subtrahends into the register in complementary form. In a binary register of the type referred to above, each subtrahend is converted to its 2's complement before it is entered, i. e., a binary subtrahend having $n$ digits is complemented before entry by subtracting the subtrahend from a binary number having $n+1$ digits in which the most significant digit is a 1 and all succeeding digits are 0's. In the binary system, this is the equivalent of converting each 1 in the subtrahend to a 0 and each 0 to a 1 and adding a "fugitive 1" to the lowest order of the result. Therefore, in subtracting by complementing subtrahends, it is necessary to add a fugitive 1 for each subtractive entry.

The present invention employs a novel system of complementary subtraction which eliminates the necessity for adding a fugitive 1 each time a subtractive entry is made. First, prior to entry of a subtrahend into the register, the value already standing in the register (the minuend) is converted to its 1's complement, i. e., each 0 is changed to a 1 and each 1 to a 0, without the addition of a fugitive digit. Second, any number of subtractive entries are made into the register by entering the true value of each subtrahend. Third, in order to register the true result, or in preparation for entry of an additive value, the result standing in the register is again converted to its 1's complement. By employing this system, the true result may be registered in all cases but one without any consideration of a fugitive digit. The single exception occurs when the values entered into the register produce a final negative result, in which case the final complementing for the purpose of registering the true result must include the addition of a fugitive 1 in the lowest order. However, this is easily accomplished by simply detecting when the value in the register falls below 0, and is considerably simpler than adding a fugitive 1 during the complementing of each subtractive entry.

The subtraction system outlined above will be seen to apply to registers which represent values in numerical systems other than the binary system. In the case of a register which contains values expressed in radix $n$, a subtractive entry may be made in the following manner. First, each ordinal digit standing in the register is subtracted from the value $n-1$; second, the true value of each subtrahend is entered into the register; and third, each ordinal digit standing in the register is again subtracted from the value $n-1$. For example, in a register which contains values expressed in the decimal system, first the value standing in the register is converted to its 9's complement; then the true values of the subtrahends are entered; and finally the result standing in the register is again converted to its 9's complement.

The novel subtraction system is particularly simple to perform in a binary register, because each order may represent only two possible values, namely, 1 or 0. Usually, a pair of elements is used in each order, and if one of the pair is operating or operated, a value is considered present while if the other is operating or operated, a 0 is considered to exist; therefore, one line of elements in the register contains the true value, and the other line of elements is in the opposite condition, which opposite condition consists of the 1's complement of the true value. Values may therefore be subtracted by providing means to add to the second line and the result may still be read in the first line.

Pairs of tubes, for example, with one or the other of each pair conducting (the conducting tube marked "X"), would indicate as follows:

Value indicating line     1. x x 0 0    0=24 (8+16)

Line normally disregarded    2. 0 0 x x x

These tubes are normally connected to add to the value indicating line. Subtraction may be performed by providing means to "add" to the normally disregarded line.

(From above) Line 2. 0 0 x x x    (subtract)
                                  x x        (add 12)
                      x 0 0 x x    New condition of line 2

Therefore, the pairs will be in the following conditions:

Value indicating line   1. 0 x x 0 0=12
                           2. x 0 0 x x

Many different types of circuits are used in the so-called trigger pair arrangement, the general characteristics of such circuits being that tubes are interconnected in pairs and one tube or the other of each pair must be conducting. A single pulse is applied to circuit elements common to the pair and this pulse is effective to change the condition of the pair so that the conducting tube becomes non-conducting and the non-conducting tube becomes conducting. A second pulse is effective to again change the condition of the pair to the original state. The state of the tubes when changed from the starting condition indicates a value in the pair, and the second pulse changes the pair back to an indication of zero or no value; but, upon changing to zero-indicating condition, the pulse energizes a member common to the next pair which changes the condition of that pair. Thus we may start with several pairs of tubes and arbitrarily state that conduction of a particular tube of each pair indicates a value in the pair, and whichever line, i. e., whichever tube of each pair, is chosen for indication will attain, in individual orders, a new state upon the impression of a first pulse and the original state upon impression of a second pulse.

Figure 16:
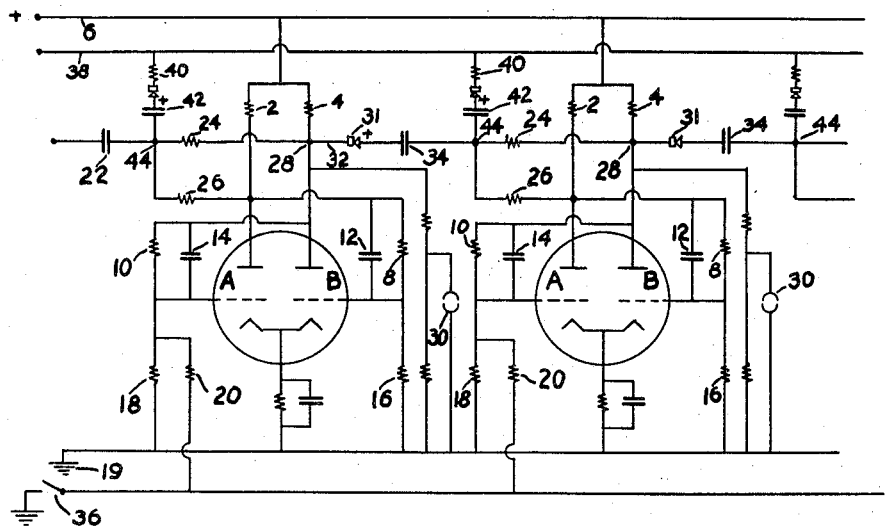
Figure 16 is a circuit diagram of an electronic circuit adapted to the performance of subtraction according to the mode of subtraction of the present invention.

One such circuit, modified for the performance of subtraction by the novel mode described, is shown in Figure 16. This circuit normally operates in response to negative pulses. A double triode is used in each binary order, the two tubes or sections of each double triode being designated as A and B. The plate of each section is connected through a respective resistor 2 and 4 to a positive supply lead 6. The plate of tube A is connected through a resistance 8 and a condenser 12, in parallel, to the grid of tube B, and the latter grid is connected through a resistance 16 to a ground lead 19. Similarly, the plate of section B is connected to the grid of section A through a resistor 10 and a condenser 14, in parallel, and through a resistor 18 to ground. An input pulse supplied through a condenser 22 is applied to both grid networks through a pair of resistors 24 and 26 which are substantially equal in value to resistors 2 and 4. As is well known in the art, a pulse supplied to this network is effective to switch conduction from section B to section A or vice versa. Assuming that with section B conducting no value is present, the change of section A to a conducting state would denote the presence of a unit value. An indicator lamp 30 may be connected in a voltage divider circuit to the plate of tube B and will glow when section B is not conducting, thereby indicating the presence of a unit value in the pair. A second input will again reverse the condition and cause section B to conduct, the sudden drop of the plate voltage when section B starts to conduct furnishing a negative pulse at a junction 28 through a condenser 34 to operate the next order in the same manner.

It will be noted that in the circuit diagram of Figure 16, a diode 31 is included in the pulse leads where the positive or negative nature of a pulse is important. It was found in practice that certain circuits require these diodes while other circuits do not; however, they tend to stabilize the operation of the circuit and prevent misoperation due to transient currents.

The preferred form of resetting is by the use of a comparatively high resistance 20 from the grid of section A, in parallel with resistor 18, which may be connected to ground through a switch 36 to effect the resetting. This has the effect of reducing the grid potential of section A so that section B will conduct. Switch 36 is also used for another purpose as will be explained hereinafter.

Means for changing the condition of the entire accumulating register consists of a common input lead 38 connected to junction 44 of each triode through a small resistance 40 and a condenser 42 in series. A negative pulse applied to lead 38 is effective to change the condition of all tubes in the register, regardless of which section is conducting in each order. The register is therefore conditioned for subtraction by a single pulse applied to lead 38 and subsequently for addition by another pulse applied to the same lead. It will be seen that an interorder carry pulse which may originate in any order by a reversing pulse on lead 38 will not interfere with that reversing pulse in the next higher order, because both the carry pulse and the reversing pulse are negative and are therefore re-enforcing. The value pulses which are to be entered into the register may therefore originate from the same source regardless of whether they are to be added or subtracted and the value entry mechanism is not altered in any way to effect subtraction of an amount instead of addition of the same.

Figure 17:
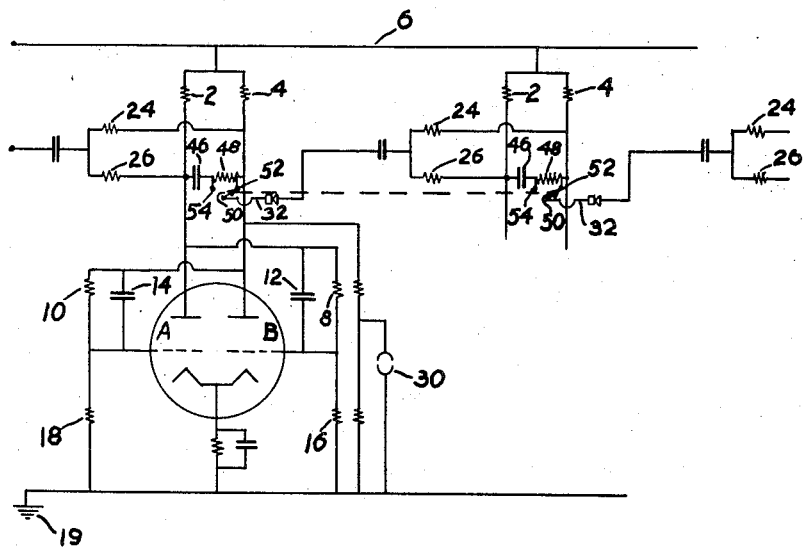
Figure 17 is a circuit diagram of another electronic circuit arrangement also adapted for the performance of subtraction.

The above is the preferred method of performing subtraction in the electronic binary counter. An alternative method employing switches is shown in Figure 17. (The same numbers are used to designate the same elements in all of the present drawings.) The circuit is essentially the same as that of Figure 16 except that means are provided to direct a negative pulse to the next higher order selectively upon a change in state from section A conducting to section B conducting or from section B conducting to section A conducting, depending on which way the switch is set. Normally, the carry pulse originates at the anode of one section, such as section B, and as previously described, the drop in potential, when this tube starts to conduct, supplies the pulse to trigger the next pair. If an attempt were made to selectively connect a switch from a carry lead directly to either anode, the switching itself would create a spurious pulse of either positive or negative polarity, depending on which section were conducting.

The means for selectively securing a negative pulse in response to either change of state consists of a condenser 46 in series with a resistor 48 connected across the two anodes. A switch 50 selectively connects a carry lead 32 to a contact 52 or a contact 54 on either side of resistor 48. Each side of the condenser 46 is charged to the potential of the anode to which it is connected. Once the trigger pair has assumed a steady state following a reversal, condenser 46 is charged and there is no flow of current through the resistor 48; therefore, there is no voltage difference between contacts 52 and 54. Whenever a reversal of the trigger pair occurs, however, the condenser 46 is recharged, so that there is a flow of current through resistor 48 and a voltage drop across that resistor. Assuming that section A is conducting (representing a unit value), switch 50 is connected to contact 52 for addition. The side of condenser 46 connected to the anode of section B is relatively positive, and a drop in potential when section B starts to conduct provides a negative carry pulse, as previously described. If, however, section B were conducting (representing a zero value in the order), the side of the condenser connected to section B would be relatively negative, and, if switch 50 were connected to contact 54, a change in state from section B conducting to section A conducting would cause a negative pulse at contact 54 to effect subtraction.

Figure 6:
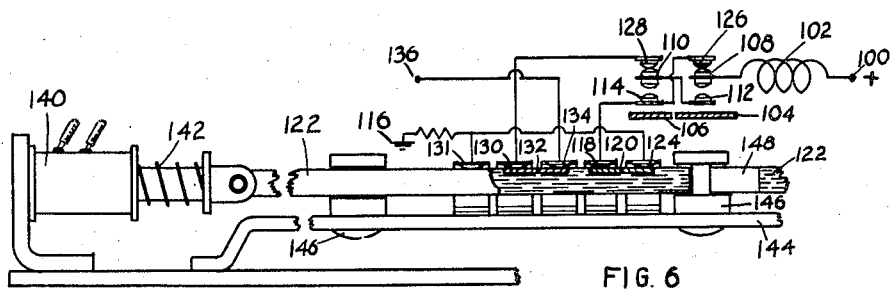
Figure 6 is a view in elevation of a form of control means which may be used to condition the relay counter units for the performance of subtraction.

From the foregoing, therefore, it will be seen that means may be provided to selectively perform addition or subtraction in a binary counter. In Figure 6, such means is shown as being used in conjunction with the counter type of relay fully disclosed in my previously mentioned co-pending application.

Briefly, the relay comprises a single coil electromagnet cooperating with both a large and a small armature, both armatures initially being in a position away from the electromagnet. When the relay coil is energized in response to a first input pulse, both armatures are moved toward the electromagnet. The small armature, in being moved, operates a latch which retains the large armature close to its full operated position, and the small armature returns, under spring pressure, to its unoperated position. A second pulse through the coil pulls the large armature to its full operated position to release the latch. The magnetic flux due to the second pulse is concentrated in a path through the large armature and therefore does not operate the small armature. Therefore, each odd-numbered pulse results in the large armature being retained close to its operated position, and each even-numbered pulse results in both armatures being in their unoperated positions, so that the relay operates in binary fashion.

Figure 7:
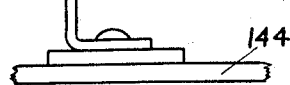
Figure 7 is a detail view in side elevation of a contact element of the control means of Figure 6.

In Figure 6, current from a source 100, upon passing through a relay coil 102, actuates the large and small armatures 104 and 106 of a relay to cause a pair of contacts 108 and 110, which are connected, respectively, to said large and small armatures, to be moved downwardly into engagement with a pair of contacts 112 and 114, respectively, with the operating pulse passing to ground (before armatures 104 and 106 have moved) along the following path: contact 108, a contact 126, contact 114, a contact 118, a contact strip 120 carried by a control rod 122, a contact 124 (see also Figure 7), and ground 116. The small, or control armature contact 110 being moved to its up position in response to a first operating pulse indicates that the relay is in an operated condition and contains a value. Upon the receipt of a next value pulse in coil 102, the coil not only operates the relay to return the armatures to the no-value or non-operated condition, but the pulse is transmitted, during an addition operation, to the relay in the next higher order along the following path: contacts 108, 112 and 110, a contact 128, a contact 130, a contact strip 132, a contact 134, and a terminal 136 which is the supply terminal leading to the relay in the next order. Thereafter, the relay for coil 102 remains in a non-operated position until receipt of the next value pulse. Through the cross-switching arrangement of Figure 6, it is possible, by means of the control rod 122, to connect contact 128 (which receives each even-numbered input pulse) to point 136 for addition, or to ground 116 for subtraction, while contact 114 (which receives each odd-numbered input pulse) may be connected to ground 116 for addition, or to point 136 for subtraction.

With the control rod 122 in the position shown in Figure 6, the system is conditioned for addition, and the carry or ground circuits for the value pulses, depending on the condition of the relay, i. e., operated or non-operated, have been described. If subtraction is to be performed, a control switch 138 (see Figure 3) is closed to supply a pulse from a current source 382 to a solenoid 140 (see Figures 3 and 6), thereby actuating the same. The actuation of solenoid 140 moves control rod 122 (Figure 6) to the left against the action of a spring 142 to cause the strip contact 120 to bridge contacts 118 and 134 and strip contact 132 to bridge contacts 130 and 131. The strip contacts 120 and 132 are, of course, properly insulated from the control rod 122.

After switch 138 is thus closed, the following subtraction circuits are set up, depending on the value condition of the relay for coil 102. If the relay is in the 0, or non-operated condition, a pulse from source 100 passes through coil 102, contacts 108, 126, 114, 118, 120 and 134 to terminal 136 and the coil for the next relay. Thus, a subtractive carry is effected if the initial relay in the chain is in its 0 condition when it receives a value pulse.

If switch 138 is closed and the relay for coil 102 is in its 1, or operated condition at the time the pulse is received, the pulse takes the following path: source 100, coil 102, contacts 108, 112, 110, 128, 130, 132, 131, to ground 116. Thus, the relay is restored to its 0 condition and the carry pulse is by-passed to ground 116.

When switch 138 is opened, spring 142 restores rod 122 to the position shown in Figure 6, for addition. A bracket support 144, carrying a plurality of studs 146, each residing within a corresponding slot 148 of rod 122, serve as the guide means for rod 122.

Attention is directed to the fact that this subtraction operation may be performed in the regular binary system or in the modified binary system disclosed in my co-pending application. The modified system provides for the adding back of 24 whenever a transfer occurs from the 10th to the 11th binary orders, thereby segregating groups of decimal 1000's. The 11th binary order then has a decimal value of 1000 instead of its normal value of 1024. Assuming that the modified form is being used, the pulses supplied to the 4th and 5th orders (having decimal values of 8+16=24) by the means provided cause a subtraction in the 4th and 5th orders whenever a transfer occurs between the 10th and 11th orders. For example, assume that the first twelve relays of a chain are in the following conditions, representing a decimal 1000:

```
12 11—10  9  8  7  6  5  4  3  2  1
 0  1— 0  0  0  0  0  0  0  0  0  0=1000
```

If the subtract switch 138 is closed and a single pulse is entered into the lowest order to subtract 1 from 1000, all orders change condition through the carry system since a pulse is transmitted from contact 114 (Figure 6) in each of the first ten orders through terminals 136 to the next higher order. The 11th order relay is therefore also operated as a result of the operation of the 10th order relay, but, since at the time of the input pulse the 11th order relay is in an operated condition, the pulse in the 11th order passes through contacts 108, 112, 128, 130, 132, and 131 to ground. No carry occurs, therefore, beyond the 11th order relay, and at the end of this operation the relays stand as follows:

```
12 11—10  9  8  7  6  5  4  3  2  1
 0  0— 1  1  1  1  1  1  1  1  1  1=1023
```

The relays which produce the add back sequence, as shown and described in my co-pending application, operate to enter a pulse into each of the 4th and 5th orders, and since these orders both stand in the 1 condition and the subtract switch 138 is closed, the pulse through each coil is directed to ground with the following results:

```
12 11—10  9  8  7  6  5  4  3  2  1
 0  0— 1  1  1  1  1  1  1  1  1  1=1023
                        1
 0  0— 1  1  1  1  1  0  1  1  1  1
                  1
 0  0— 1  1  1  1  1  0  0  1  1  1=999
```

It will thus be seen that true accumulation of positive or negative amounts may be performed with the means provided.

BINARY DIVISION

Division may be accomplished by a series of subtractions, first in the highest orders, then down through the lower orders. Since the binary system employs only the values 0 and 1, a binary divisor which is aligned with the highest orders of a binary dividend, or remainder may not be subtracted from that dividend or remainder more than once; that is, the divisor is contained in the corresponding orders of the dividend or remainder either once or not at all. Taking the binary equivalent of the decimal problem 1023÷33=31, for example:

```
             10  9  8  7  6  5  4  3  2  1
quotient                     1  1  1  1 1=31
              1  1  1  1  1  1  1  1  1 1=1023
less          1  0  0  0  0  1          =33
              0  1  1  1  1  0  1  1  1 1
less             1  0  0  0  0  1
              0  0  1  1  1  0  0  1  1 1
less                1  0  0  0  0  1
              0  0  0  1  1  0  0  0  1 1
less                   1  0  0  0  0  1
              0  0  0  0  1  0  0  0  0 1
less                      1  0  0  0  0 1
              0  0  0  0  0  0  0  0  0 0
```

The highest order of the dividend is aligned with the highest order of the divisor and subtraction is performed. It should be noted that the first digit of the quotient is aligned with the lowest order of the divisor, and subsequent quotient digits follow in the same manner.

The same problem using 31 as the divisor illustrates zeros in the quotient as follows:

```
             10  9  8  7  6  5  4  3  2  1
quotient                  1  0  0  0  0 1=33
              1  1  1  1  1  1  1  1  1 1=1023
less          1  1  1  1  1             =31
              0  0  0  0  0  1  1  1  1 1
less                         1  1  1  1 1
              0  0  0  0  0  0  0  0  0 0
```

The method of subtraction was previously explained and consists of effecting switching as shown in Figure 6 by energization of solenoid 140.

Pattern calculation

In performing the calculations of multiplication and division, it is convenient to employ three registers. A first register receives the multiplicand or divisor, a second receives the multiplier or quotient, and a third receives the product or dividend. These registers may be interrelated by some arithmetic unit to produce in one register a result value which is derived from factor values standing in the other two registers. The arithmetic unit must be capable of aligning successive groups of orders of one factor with the orders of the other factor and performing the necessary mathematical operation during each such alignment. Various adders, counters, shifting devices and the like have previously been employed in numerous arrangements to synthesize arithmetic units having the above properties, but these arrangements have consistently been uneconomical in either equipment, or time of operation, or both.

It has been discovered that a fully articulate arithmetic unit may be formed of a matrix, or pattern of conductors which are sensed by elements that are integral with the various orders of the registers. By changing the sensing relationships between the sensing elements and the matrix, the ordinal relationships between the registers may be altered to simulate ordinal shifting.

In preparation for a calculating operation, values may be entered into the factor registers in any known manner. My co-pending application, mentioned hereinbefore, shows one convenient way in which values may be selectively entered into a register. Pattern representations of the possible factors may be arranged in tabular form, as for example, in rows and columns on a drum surface, and the drum surface may be scanned to locate a selected value. An output pattern which is on the same drum, or which is scanned in timed relation with the scanning of that drum, is energized in response to the selection of a value and, in turn, enters a representation of that value into the appropriate register. The selection of a value may employ a coincidence recognition technique where each value on the drum is assigned an "address" and where all of the addresses are successively counted or scanned until a coincidence or a predetermined count occurs.

Figure 1 shows substantially the type of operation referred to above. A binary counter 198 is sensed by a sensing drum 200 which has the same binary pattern as that disclosed in my co-pending application. The output pattern 208 is in accordance with any table desired and may be considered to be equivalent to the decimal indicating drums of my co-pending application, the difference being that this section of the drum carries a pattern, and the surge of current which normally operates the light control source for the strobotrons of my copending application is effective to enter a selected value into a divisor register comprising a bank of relays 218 or into a similar multipler bank. The operation of the divisor bank starts the sensing of a division pattern drum 226 which is effective to divide the selected divisor into a dividend which has been previously set up in a dividend register comprising a bank of relays 242 and to produce a quotient in a quotient register comprising a bank of relays 254. This quotient may then be translated by the regular translating device 199, described in my co-pending application.

DIVISION

Divisor selection

In performing division, it is to be understood that the sensing pattern and its associated sensing means of my above-identified co-pending application may be utilized to provide a divisor value. In following through a problem in accordance with the sequence of the schematic diagram of Figure 1, reference is first had to Figure 5, wherein a sensing drum 200 carrying a regular binary pattern 201, and sensing means indicated generally at 202 associated therewith are the same as set forth in my aforesaid application. Relays in the first and third orders of the sensing means 202 are shown as being in operated condition and as being sensed. An output pattern drum 204 is insulated from the drum 200 and is connected to ground 206, drum 204 carrying a conducting surface pattern 208. When that part of the binary pattern 201 which underlies the sensing fingers corresponds to the value standing in the sensing relays (this value in the example shown would be the binary value 101), a relay 210 is energized by means of a circuit which is completed from a current source 212, through the successive relay contacts, sensing fingers and conducting pattern areas. The energization of relay 210, which in my co-pending application is utilized to cause energization of a stroboscopic indicator light, closes a pair of contacts 213 and 214 to make a current source 216 effective to operate any of a divisor bank of relays 218 which has its sensing finges 219 on a conducting portion of drum 204. Thus, in the example of Figure 5, the 3rd and 5th relays 218 are energized when the circuit to relay 210 is closed, the closing of contacts 213 and 214 completing a circuit through these relays and the drum 204 to ground 206. When operated, the relays 218 are locked down by either a mechanical latch or electrical ground contacts operable when the relay armatures are down. Upon selection of the divisor in this manner, the division process is started by means now to be described.

Division mechanism

Figure 3:
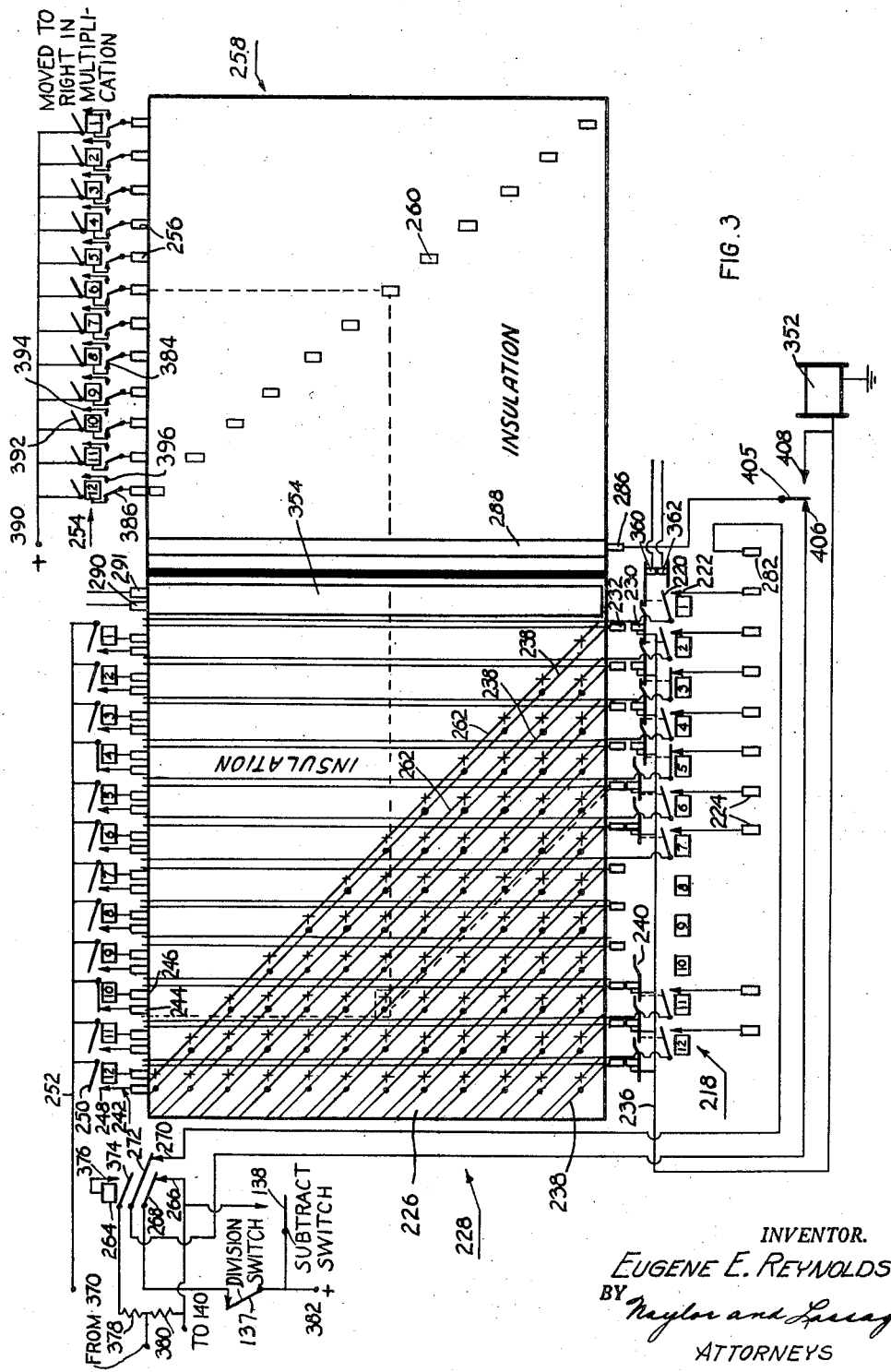
Figure 3 is a schematic view of the calculator elements of the machine showing the inter-relationship between said elements.

Referring to Figure 3, the divisor bank 218 is shown at the bottom thereof. The sensing fingers 219 of the relays of the bank are not shown in Figure 3, the operated condition of each being denoted by the closed condition of an ordinal pair of contacts 220 and 222 which are operated by that relay. These contacts close a circuit from a set of ordinal sensing fingers 224 to a pattern 226 on a dum 228. In addition to contacts 220 and 222, each relay 218 operates a pair of normally closed contacts 230 and 232 which terminate as sensing fingers 234 (shown in detail in Figure 8) on the drum 228 and normally connect a lead 236 to a diagonal conducting strip 238 of pattern 226 on drum 228. Each contact 230 is carried by an arm 240 extending in overlying relation to the arm 240 for the contact 230 of the next lower order relay. The arm 240, which carries a given ordinal contact 230, is operated by the closure of the contacts 220 and 222 of the next higher order. Thus, the highest order relay of bank 218 which is operated is effective to break all the connections 230 and 232 in the lower orders regardless of whether or not the lower order relays of the bank contain a value. For example, if the fifth and third order relays of the bank are operated, as shown in Figure 3, the related contacts 220 and 222 are closed, and all the contacts 230 and 232 controlled by the relays in the fifth and lower orders are broken, so that the four lowest orders are disconnected from their related strips 238.

The dividend register comprises an ordinally arranged bank of binary relays 242 of the type previously described, each relay being associated with a pair of sensing fingers 244 and 246. The fingers 246 are provided for receiving current from the diagonal strips 262 to operate their respective relays of bank 242. Fingers 244 are connected to contacts 248 and 250, which upon closure by operation of their respective relays, complete a circuit to a lead 252. The relays in the dividend bank 242 have inter-order carry connections (not shown) of the type previously described in relation to Figure 6, and are therefore able to receive additive or subtractive entries.

The quotient is registered, during the process of division, in an ordinally arranged bank of relays 254 by means of respective ordinal sensing fingers 256 in contact with a drum 258 which is integral with but insulated from drum 228. Drum 258 is provided with a set of diagonally disposed contacts 260 in alignment with the fingers 256 for cooperation therewith.

The pattern 226 constitutes means for transferring values from one bank of relays to another. The diagonal pattern strips 238 are effective to determine the particular order of the dividend bank 242 from which the highest order of the divisor bank 218 should be entered, while the diagonal pattern strips 262 determine which particular orders of the divisor bank 218 contain values and serve to enter those values into the proper related orders of the dividend bank 242. The pattern contacts 260 on drum 258 are effective to enter values into the proper orders of the quotient bank 254.

Referring to the lowest order relay of bank 218, it will be seen that if the armature thereof were in an operated condition, and none of the other relays of the bank were in such condition, the contacts 230 and 232 for all of the contact strips 238 would be closed, and the contacts 220 and 222 of the first order relay would likewise be closed. Assuming that it is desired to enter this lowest order value of the divisor bank into the #12 order relay of the dividend bank 242, the drums must be rotated, by means hereinafter described, until the sensing fingers 244 and 246 for this #12 relay engage the first pair of contact strips 238 and 262. At the same time, the #12 sensing finger 256 of the quotient bank 254 engages its related contact 260. If, however, it is desired to enter the lowest order value of the divisor bank into the #1 relay of the dividend bank 242, the drums would have to rotate to a position in which the sensing fingers 244 and 246 of the first order relay of bank 242 contact the #1 diagonal strips 238 and 262 of drum 228. In this position, the #1 contact 260 of drum 258 is engaged by its related sensing finger 256.

The mode of operation in the performance of division is as follows: The relay bank 218 (Figures 3 and 8), containing the divisor, has associated therewith the contacts 230 and 232, which, as previously stated, are broken in all orders of the divisor below the highest order containing a value. Since the contacts 232 engage the diagonal strips 238 and serve to complete the circuit through these strips, none of the strips 238 below the highest order of the divisor containing a value is effective. The completion of a circuit from lead 236, contacts 230 and 232, strip 238, sensing finger 244 and contacts 248 and 250 to lead 252 is not accomplished until the highest order value of the divisor is in diagonal alignment with the highest order relay of the dividend bank 242 in which contacts 248 and 250 are closed. The completion of this circuit from lead 236 to lead 252 is utilized to stop the advance of the drums 228 and 258, by means to be described, and to introduce a pulse seriatim through each of a series of sensing fingers 224 (Figure 3) of the divisor bank 218. The contacts 220 and 222, which are closed to indicate values in their related ordinal relays, are effective to subtract a value from the dividend bank 242 through sensing fingers 318 (Figure 8) of the divisor bank, diagonal contact strips 262 and sensing fingers 246 of the dividend bank. A pulse from a finger 282, through a pair of contacts 270 and 272 and a pair of contacts 406 and 405, to a finger 286 is also applied to drum 258 to operate the particular one of the quotient bank relays 254 which has its sensing finger 256 in engagement with a contact 260 when the diagonal alignment on drum 228 is achieved. The drum 228 is then moved until again stopped by the completion of the circuit from lead 236 to lead 252, and the subtraction operation is then repeated. One step-by-step traverse of the pattern 226 and contacts 260 is therefore effective to complete a division operation.

Before describing the solution of a division problem in specific detail, it will be well to first mention a condition which might arise in the dividend bank during the process of division. As previously stated, the pattern 226 provides for the diagonal alignment of the highest order of the divisor with the highest order of the dividend. No provision is made for determining whether the divisor is greater than the dividend, although it is possible to provide for such a determination. If the divisor happens to be greater, a negative carry will occur in all orders to the left of the highest order value relay of the dividend bank, thus denoting an overdraft. A relay 264, included in the dividend bank 242, but representing an off-board order, has carry connections (not shown) from the highest order relay and is therefore operated by the overdraft. When such an overdraft occurs, the machine is thereupon set for an add operation, which occurs at the next step of advance of drum 228, i. e., when the divisor is aligned with the next lower group of dividend orders. This is done through the breaking of a pair of contacts 266 and 268 by operation of the relay 264. It will be recalled that solenoid 140 is operated to condition the machine for a subtraction step. This solenoid may be operated by the depression of a divide key or a subtract key to close a divide switch 137 or a subtract switch 138. Since the source of current to operate solenoid 140 is through contacts 266 and 268, it will be seen that if an overdraft occurs the solenoid will be de-energized and an add operation will ensue.

In the binary system, the subtraction of a value in any order and the addition of the same value in the next lower order are equivalent to a subtraction of that value in the lower order. In the best-known method of division, if the divisor value is greater than the dividend value with which it is aligned, the procedure is to move the divisor to the next lower group of dividend orders and subtract. If the quotient bank 254 were provided with inter-order carry connections, the correct quotient value could be obtained by subtracting in this bank when the divisor is added, and adding in this bank when the divisor is subtracted, during division. Without such carry connections, however, it is only necessary to disable the entry into the quotient register when an overdraft exists in the dividend bank, and this is achieved by the breaking of contacts 270 and 272 by the operation of relay 264. It will be understood that the add or subtract control of the quotient bank 254 may be accomplished by operating control rod 122 (see Figure 6) in response to an overdraft, if the quotient bank 254 is provided with carry connections.

A problem in which an overdraft occurs would be, for example, 520÷20=26, the sequence of which is as follows:

|  | Offboard | 10 | 9 | 8 | 7 | 6 | 5 | 4 | 3 | 2 | 1 |
|---|---|---|---|---|---|---|---|---|---|---|---|
| Line 1 quotient | — — |  |  |  |  | (1) | 1 | 1 | 0 | 1 | 0=26 |
| Line 2 | 0 — — |  | 1 | 0 | 0 | 0 | 0 | 0 | 1 | 0 | 0=520 |
| Line 3 |  |  | 1 | 0 | 1 | 0 | 0 |  |  |  | =20 |
| Line 4 overdraft | (1) — — |  | 1 | 1 | 1 | 0 | 0 | 0 | 1 | 0 | 0 |
| Line 5 | add |  |  | 1 | 0 | 1 | 0 | 0 |  |  |  |
| Line 6 | 0 — — |  | 0 | 0 | 1 | 1 | 0 | 0 | 1 | 0 | 0 |
| Line 7 |  |  |  |  | 1 | 0 | 1 | 0 | 0 |  |  |
| Line 8 |  |  | 0 | 0 | 0 | 0 | 1 | 0 | 1 | 0 | 0 |
| Line 9 |  |  |  |  |  | 1 | 0 | 1 | 0 | 0 |  |
| Line 10 |  |  | 0 | 0 | 0 | 0 | 0 | 0 | 0 | 0 | 0 |

Figure 4:
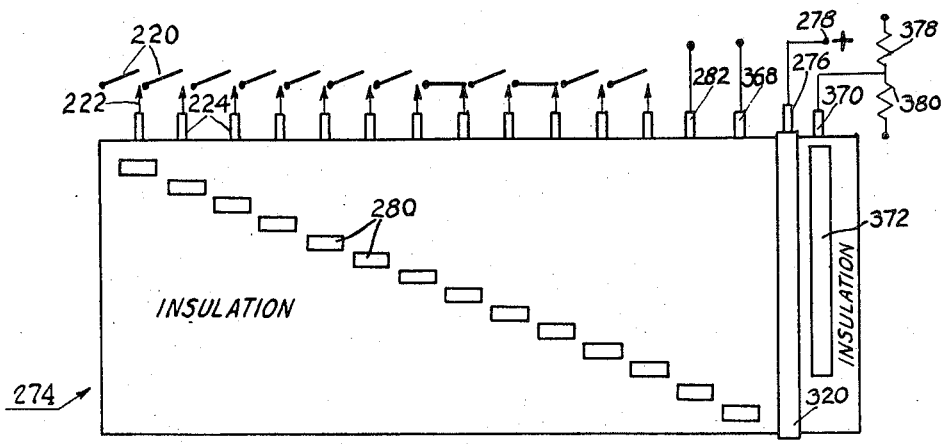
Figure 4 is a view, partially in diagrammatic form, of a value-entering pattern drum for the machine.

Assuming this problem to be set up in the machine, the divisor value of bank 218 is contained in five orders, and at the start, the dividend bank 242 has a value in each of the 10th and 4th orders, as shown in Figure 3 and as indicated in line 2 of the above sequence table. Drum 228 is started turning, by means hereinafter described, and it will be noted that the first time the circuit across leads 236 and 252 can be completed is when the finger 244 for the 10th order dividend relay engages the fifth order diagonal strip 238, which position is indicated in dotted outline on the pattern 226 of Figure 3. At this position the sixth order sensing finger 256 of the quotient bank is in engagement with the contact 260 indicated by the dotted coordinate lines in Figure 3. The advance of the drums 228 and 258, which rotate as one, is stopped, and through a one-cycle clutch, hereinafter described, a drum 274 (Figure 4) makes one revolution. Drum 274 obtains current through a contact finger 276 from a source 278, and the current is sequentially fed through a set of diagonally arranged contacts 280 to the sensing fingers 224 (Figures 3 and 4). Beginning with the highest operated relay of the divisor bank 218 and ending with the lowest operated relay, the fingers 224 supply pulses through the closed contacts 220 and 222 to diagonal contact strips 262 and through the fingers 246 to the relays of the dividend bank 242 to operate the same. Thus, with drum 228 in the dotted line position of Figure 3 with respect to the fingers 246, pulses are supplied through strips 262 from the fifth order of the divisor bank 218 to the tenth order of the dividend band 242 and from the third divisor order to the eighth dividend order to effect subtraction of the divisor value from the five highest dividend orders.

A value is normally entered into the quotient bank 254 by a pulse which is supplied from drum 274 (Figure 4) through finger 282 (Figures 3 and 4), contacts 270 and 272, contacts 406 and 405, hereinafter described, sensing finger 286, contact strip 288 of drum 258, and the ordinally related contact 260 and sensing finger 256, i. e., the sixth order of the quotient register. However, since in the first stage of the particular problem at hand there is an overdraft resulting in the operation of relay 264, the contacts 270 and 272 are open and no quotient value is registered in the sixth order.

The effect of the overdraft is to leave values in the eighth, ninth and tenth orders of the dividend bank 242, as indicated in line 4 of the above sequence table. Drum 228 advances an incremental step and it is stopped at the next ordinal position because the highest operated order of the dividend bank 242 cannot pass through the position of diagonal alignment with the highest operated order of the divisor without completing the aforementioned circuit across lines 236 and 252, and, as will be shown hereinafter, the completion of this circuit stops drum 228 and activates the rotational sweep of drum 274. The add operation in the next order (see line 5 of the sequence table) clears the overdraft (see line 6) and the pulse to drum 258 is entered in the fifth order relay of quotient bank 254 (see line 1). After this add operation, the highest dividend order containing a value is the eighth (see line 6), and the eighth order is aligned with the diagonal strip 238 for the fifth divisor order when the fourth order quotient relay has its finger 256 in contact with the fourth order contact 260 (see line 7). Again, through the drum 274, all values, including the quotient, are entered, and the drum 228 is advanced after the single cycle sweep of drum 274. After the subtraction and the entry of a pulse in the fourth quotient order, the highest order of the dividend bank 242 to contain a value is the sixth (see line 8) and the fifth diagonal strip 238 contacts the sixth order dividend finger 244 when the quotient pattern comprising contacts 260 is in its second order position (see line 1). The subtraction, by means of one rotation of drum 274, completes the division problem. The dividend bank 242 is clear, i. e., contains no balance (see line 10), and the quotient bank 254 (see line 1) shows the value 11010, equal to 26 in the decimal system. A pair of contact fingers 290 and 291 (Figures 3 and 8) serve to stop the advance of drum 228 upon completion of the problem, as will be hereinafter more fully described.

*Divisor relays*

Figure 11:
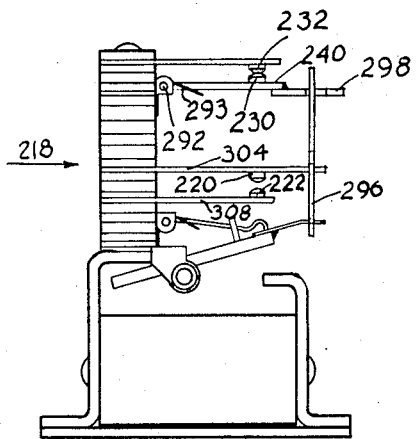
Figure 11 is a view in side elevation of the relays of Figure 10, showing the electrical contact system controllable by operation of a relay.
Figure 10:
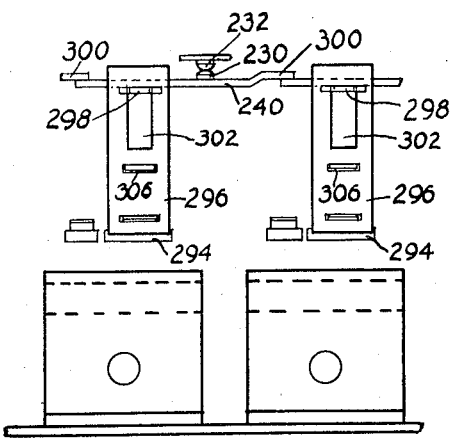
Figure 10 is a view in front elevation of a pair of interconnected counter relays of the divisor or multiplicand bank of the calculator.

As described in connection with Figure 3, there are two sets of contacts operated by each relay of the divisor bank 218. One set comprises the contacts 230 and 232 which serve to stop the advance of the drum 228 through the diagonal strip 238 associated with the highest order of dividend bank 218 which contains a value, and the other set comprises contacts 220 and 222 which serve to transfer to the dividend register values contained in the individual divisor orders in correct relationship to the highest operated divisor order. The details of these relay contacts and connections are shown in Figures 10 and 11, wherein each relay of the bank 218 (said relays being more fully described in my above-mentioned application) is shown as being provided with a fixed contact 232 and a movable contact 230, contact 230 being supported on an arm 240 which in turn is pivotally mounted at 292 and urged by a spring 293 toward contact 232. Upon downward movement of the large armature 294 (Figure 10) in response to operation of the relay, a link 296 is moved downwardly and carries with it a link 298 which is secured to the arm 240. Thus, operation of the relay breaks the contacts 230 and 232. An offset end 300 of the arm 240 overlies the arm 240 for the relay of the next lower order, so that all the contacts 230 and 232 for the lower order relays are likewise broken. A slot 302 is provided in each link 296 for receiving the end of the related link 296 to thereby enable the related arm 240 to be rocked downwardly under the operation of a higher order relay regardless of the position of the particular relay armature 294 with which the arm 240 is associated. A pair of the previously described contacts 220 and 222 are also carried by each of the relays 218, contact 220 being carried on an arm 304 which extends into a slot 306 in link 296, and contact 222 being carried on a fixed arm 308. Operation of the relay thus serves to bring the contacts 220 and 222 into engagement, and upward movement of the armature 294, as when the relay is cleared of a value, serves to break these contacts.

*Drums*

Further details of drums 228 and 258 are shown in Figure 8. The drum 228 is provided with vertical sensing plates 310 and 312 extending to a greater peripheral diameter than the drum. This construction is used to insulate these plates from the diagonal conductor strips 238 and 262 which they cross. A connection is made at 314 and 316 so that each vertical plate 310 is connected to only one diagonal strip 262, and each vertical plate 312 is connected to only one diagonal strip 238.

Figure 9:
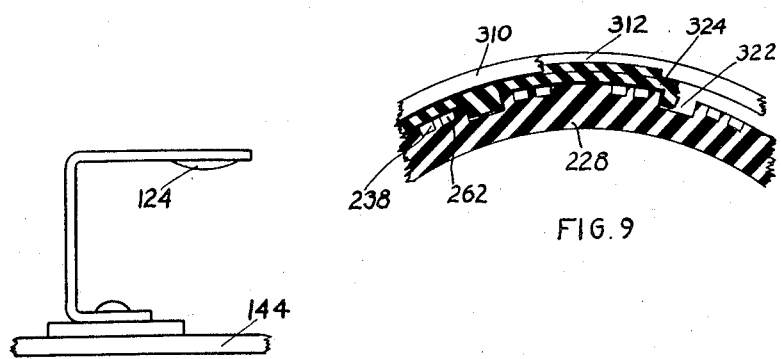
Figure 9 is a detail view in section of the sensing pattern drum of Figure 8.

Figure 9 illustrates, in cross section, a form of construction for the drum 228. The drum body 228, which may be formed of any suitable insulating material, carries the spiral or diagonal strips 238 and 262 which are of a suitable conducting material. Secured to the drum body 228, as by tongue and groove construction, indicated at 322, are spaced rings of insulating material 324 having an inside diameter of approximately the outside diameter of the drum body 228. The vertical plates 310 and 312 are carried by and secured to the rings 324, and the connections 314 and 316 (see Figure 8) are then made, as by solder, between the plates 310 and 312 and the diagonal strips 262 and 238.

*Drive mechanism*

Figure 2:
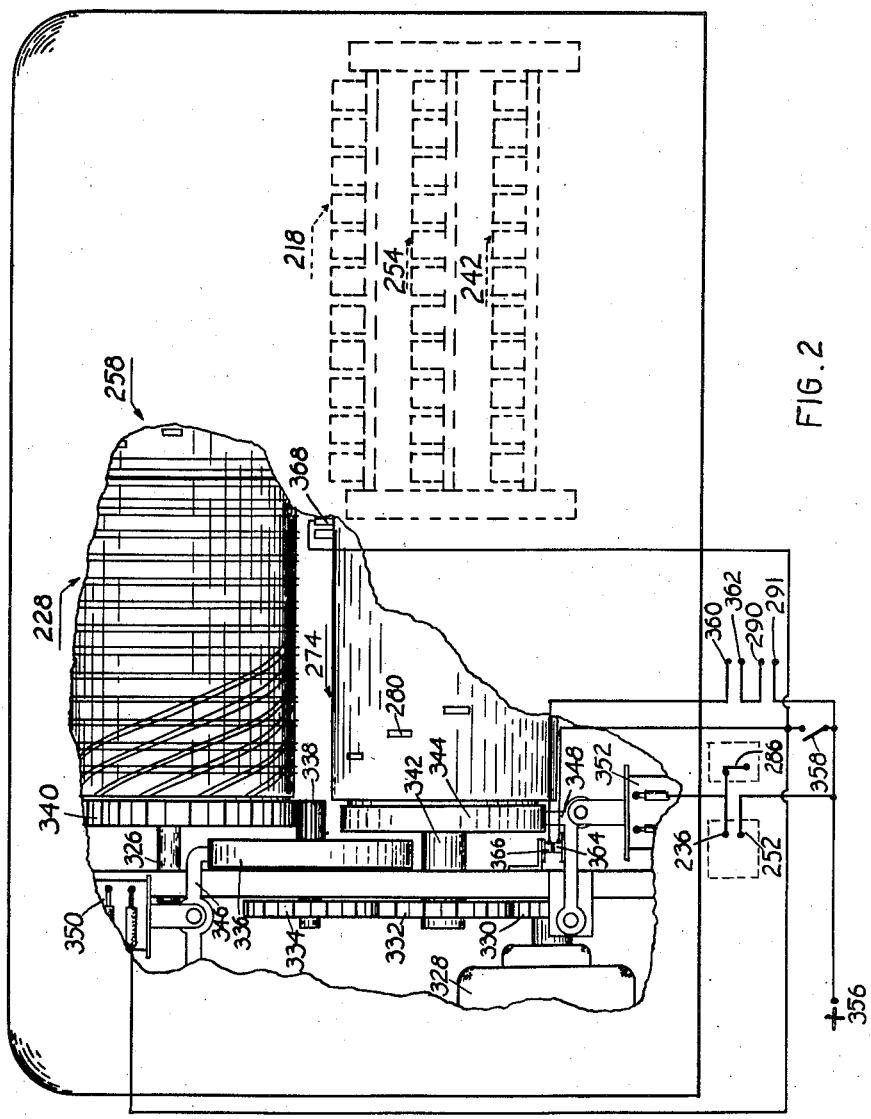
Figure 2 is a view in elevation, partly broken away, of a form of the calculating machine of the invention, showing the general arrangement of the mechanical parts and control system therefor.

A general view of the machine is shown in Figure 2. The drums 228 and 258 are mounted on a shaft 326 and driven by a motor 328 through a pinion 330, a pair of gears 332 and 334, a one-cycle clutch 336, a pinion 338, and a gear 340 carried by shaft 326. Drum 274 is mounted on a shaft 342 and is driven by motor 328 through pinion 330, gear 332 and a one-cycle clutch 344. The clutches 336 and 344 may be of any well-known construction, and are operated, respectively, by clutch dog 346 and a clutch dog 348, which in turn are operated, respectively, by a solenoid 350 and a solenoid 352. Solenoid 350, when energized, operates clutch dog 346 to engage clutch 336 and connect gear 334 to shaft 326 through pinion 338 and gear 340. The pinion 338 is of such a ratio to the gear 340 as to drive the drum 228 from one stop position to the next in one rotation of the pinion. Solenoid 352, when energized, operates clutch dog 348 to engage clutch 344 and connect gear 332 to drum 274. The operation of solenoid 352 is controlled by the sensing circuit between leads 236 and 252 (Figures 2, 3 and 8) to definitely limit the rotation of drum 274 to a single cycle at each position at which drum 228 is stopped, and only at such positions.

The control sequence of the clutches 336 and 344 is as follows: Clutch 336 controls the rotation of drum 228, and drum 228, once started, rotates until the highest value order of the divisor bank 218 is in diagonal alignment with the highest value order of the dividend bank 242. Referring to Figure 8, it will be noted that fingers 290 and 291 engage strip 354 and that strip 354 does not completely encircle drum 228, there being a discontinuity in this strip at the starting position for the drum. Current from source 356 (see also Figure 2) therefore does not flow between fingers 290 and 291 when the drum 228 is at the starting position. Depression of a start key (not shown) closes a switch 358 to connect current source 356 to solenoid 350 and operate the same. This operating pulse is preferably a short one and effective to engage clutch 336 for a sufficient time to rotate the pinion 338 one rotation to cause a one step advance of drum 228. This one step advance of the drum closes the circuit between fingers 290 and 291 (Figures 2 and 8) by advancing the strip 354 into bridging relation therebetween. Clutch 336 thereafter continues to be engaged because of energization of solenoid 350 through source 356, despite release of the start key to open switch 358, provided that contacts 360 and 362 (see also Figure 3) and contacts 364 and 366 are closed. Contacts 360 and 362 are provided to insure that a value is contained in bank 218, and also to provide a delay and automatic start when a divisor is entered into bank 218 through means previously described. This is accomplished through operation of contact 360 by means of the arm 240 (Figure 3) in the lowest divisor order, so that contacts 360 and 362 are closed when and only when one or more of the divisor orders contains a value. Contacts 290 and 291 are provided to keep the pattern drum 228 progressing step-by-step until a full pattern traverse is made, and contacts 364 and 366 are provided to stop the advance of drum 228 during the operation of drum 274 which is operated by solenoid 352 (Figure 2) and clutch 344, it being noted that contacts 364 and 366 are broken when the dog 348 for clutch 344 is operated by solenoid 352. Clutch 344 is operated whenever the circuit is complete between leads 236 and 252, or in other words, when the highest value in the divisor bank 218 is aligned with the highest value in the dividend bank 242.

It will be noted that this related operation of solenoids 350 and 352 prevents the advance of drum 228 until the divisor is subtracted from the dividend so that the highest dividend value is then in a lower order.

The offboard relay 264 is provided to condition the machine for addition when an overdraft occurs during division, and this is accomplished through contacts 266 and 268 (Figure 3), as previously explained. Another set of contacts 270 and 272 disable entry to the quotient register if an overdraft is present. The quotient is normally entered through finger 232, contacts 270 and 272, contacts 406 and 405, and finger 286. If contacts 270 and 272 are broken, the quotient pulse is blocked and does not reach finger 236.

It is desirable to advance the pattern of drum 228 one step if an overdraft is present, as previously described, and the means for doing this comprises a finger 368 (see Figures 2 and 4) on drum 274. The current supplied to finger 368 upon engagement with an associated contact 280 (which is engaged near the end of a rotation of drum 274) is effective to operate solenoid 350 even though contacts 364 and 366 are broken. Since clutches 336 and 344 are one-cycle clutches, as previously noted, they produce a full cycle of operation once their respective dogs have been tripped, as in well-known clutch constructions. Therefore, the breaking of contacts 364 and 366 is sufficient to de-energize solenoid 350 at the beginning of rotation of drum 274, but the fact that contacts 364 and 366 are broken does not prevent solenoid 350 from being energized at the end of a rotation of that drum.

Means are provided to hold the plus operating condition for a full cycle of drum 274 by supplying a hold current for offboard relay 264 through a finger 370 (see Figure 4) on a contact strip 372 of drum 274, a resistor 378 (Figures 3 and 4) and a pair of contacts 374 and 376 (Figure 3). If the relay 264 has been energized previously because of an overdraft, it would normally be released when the overdraft is corrected during the rotation of drum 274, but current supplied through finger 370 is effective to hold it in operation until completion of the sequential sweep of the pattern of drum 274. This holding current is also connected, through a resistor 380 (Figures 3 and 4), to solenoid 140, which as previously described, controls the subtraction operation. Therefore, if solenoid 140 is operated, it remains in an operated condition, even though the contacts 266 and 268 are broken during calculation, until the pulse entry is completed through drum 274. The normal release of the offboard relay 264 is accomplished by a carry pulse and therefore the contacts 374 and 376 for the hold current may be set to require a full operation of relay 264 before they are brought into engagement to enable the supply of holding current to the relay.

The resistances 378 and 380 (Figures 3 and 4) are together of such value as to prevent current from supply source 382 for solenoid 140 from acting as a holding current for relay 264, while these resistances are of such individual values as to enable the current from finger 370 to hold solenoids 264 and 140. The resistances 378 and 380 are not necessary if separate hold current windings are provided for solenoids 264 and 140.

The advance of the pattern of drum 228 one step after any operation is effective, under some conditions, to save an operation which would otherwise result in an overdraft. It is to be observed that not more than one cycle per order is necessary under any circumstances due to the nature of the system. Taking, for example, the problem 175÷25=7, the solution of which is set forth in the following table:

```
       10 9 8 7 6 5 4 3 2 1
                  (1) 1 1 1=7
       0— 0 0 1 0 1 0 1 1 1=175
             1 1 0 0 1       =25
       1— 1 1 1 1 1 0 0 1 1 1
             1 1 0 0 1
       0— 0 0 0 1*0 0 1 0 1 1
             1 1 0 0 1
       0— 0 0 0 0 0 1 1 0 0 1
                 1 1 0 0 1
       0— 0 0 0 0 0 0 0 0 0 0
```

\* NOTE.—The result of the first subtraction is an overdraft, and therefore the pulse to the quotient bank 254 is blocked. The addition of the value in the next order clears the overdraft, but leaves a value in the seventh order with which the divisor was previously aligned, so that normal operation would result in another overdraft; therefore, the divisor must be subtracted one order to the right. The alignment of the fifth order diagonal strip (connected to the fifth divisor order) with the sixth dividend order does not stop drum 228, since contacts 248 and 250 are broken in the sixth dividend order. Nevertheless, all diagonal strips above the highest order of the divisor are energized, in accordance with their no-value condition, and are therefore effective to stop drum 228. In this case, the sixth order diagonal strip completes the circuit to stop drum 228 and cause a subtraction. Means to clear the overdraft at the last order are not provided unless the quotient bank 254 is provided with a carry circuit, which circuit would add to the required mechanism.

MULTIPLICATION

Figure 5:
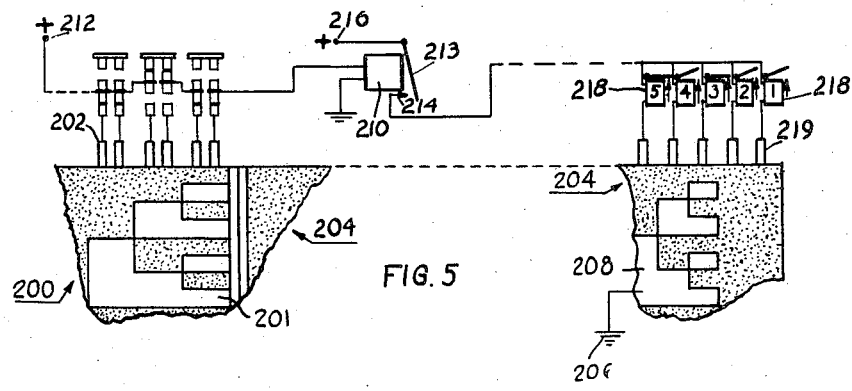
Figure 5 is a partial view in elevation of a form of calculator means adapted to perform simple multiplication through the medium of off-set pattern value representation, which means may also serve as value entry means for the calculating machine of the invention.

Referring to Figure 5, it will be noted that the geometry of the pattern contacts 208 of drum 204 is similar to that for the pattern contacts 201 of the drum 200, but that the pattern 208 is displaced two orders to the left on its drum in comparison with the position of the pattern 201. Thus, each pattern contact 208 represents four units, while its counterpart on drum 200 represents one unit. A form of multiplication is thus achieved by offsetting one pattern with respect to the other. In the particular case shown in Figure 5, multiplication by four is achieved from pattern 201 to pattern 208. Means are thus available to multiply any value sensed by drum 200 by any desired factor by utilizing the sensing pattern of drums 204 in variable offset relation, and by transferring the value directly to the relay bank 218, which bank, in this event, would serve as a product bank. While, however, this offset pattern relationship provides a means for performing multiplication, the pattern of drum 228 of Figure 3 is also adapted to perform multiplication as well as division. When using the device shown in Figure 3 to perform multiplication, the bank 218 then becomes the multiplicand bank, bank 242 becomes the product bank, and the multiplier is set up in bank 254, either directly or through a multiplying pattern such as that shown in Figure 5.

Figure 12:
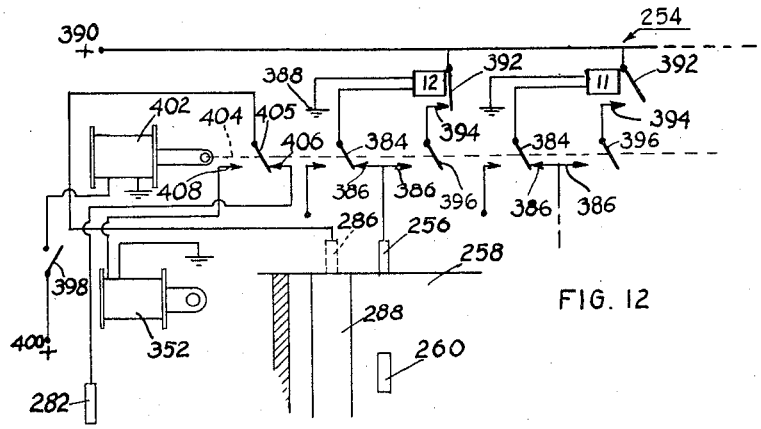
Figure 12 is a diagrammatic view of the switching control system adapted to selectively condition the calculator for division or multiplication.

The additional control system for adapting the described machine for multiplication as well as division is shown in Figure 3, but more in detail in Figure 12. Each sensing finger 256 is connected, during a division operation, by a pair of contacts 386 and 384 through the ordinally related relay of bank 254 to a ground connection 388. To condition the machine for multiplication, it is necessary to connect each finger 256 to a supply current source 390 through contact 386, a contact 396 and a pair of relay contacts 392 and 394. This connection is achieved through the closing of a multiplication switch 398 to supply an operating current from a source 400 to a solenoid 402, thereby energizing the latter to move a control rod 404 to the left and move switch contacts 396 into engagement with contacts 386 and contacts 384 into engagement with ordinally related open circuit contacts. The previously described contact 405 (Figures 3 and 12) is also moved from contact 406 to a contact 408 to thereby disconnect finger 282 from finger 286, and connect finger 286 to the clutch control solenoid 352. Solenoid 352, it will be remembered, is effective to stop the advance of drum 228 and allow entry of the ordinal values standing in the bank 218 into the related relays of bank 242. The pattern of drum 228 is automatically advanced at least one step upon rotation of drum 274 and therefore, with the machine set for add operation and with the solenoid 402 operated, the patterns of drum 228 and drum 258 will multiply any amount in bank 218 (now the multiplicated bank) by the value contained in bank 254 (now the multiplier bank) by successive entry into bank 242 (now the product bank) each time a value is encountered in bank 254. There is no change in the method of entering values or the operation of the machine, the difference between multiplication and division being that in the former, the control of the stopping of the pattern is transferred from the diagonal pattern lines 238 to the pattern contacts 260 of drum 258.

A specific problem in multiplication is 6×7=42, which in the binary system is solved as follows:

```
       1 1 1=7
       1 1 0=6
     1 1 1
   1 1 1
   1 0 1 0 1 0=42
```

It will be noted that the solution of this binary system multiplication problem is, by mathematical process, the same as the solution of a decimal system multiplication problem with the exception that in the binary system we are concerned only with ones and zeros, and therefore only have to enter the multiplicand into the product bank 242 each time the value "1" is encountered in the multiplier. It will be clear from Figures 3 and 12 that a value in an order of bank 254 completes a circuit through a finger 256 when the appropriate ordinally related contact 260 is contacted by that finger, and the circuit completed is from source 390 through contacts 392, 394, 396 and 386, finger 256, contact 260, strip 288, finger 286, contacts 405 and 408, and solenoid 352 to operate the latter. Operation of the solenoid 352 stops the pattern drums 228 and 258 and enters all values standing in the multiplicand bank 218 into the proper orders of the product bank 242 through the diagonal pattern of drum 228, by one cycle of operation of drum 274.

The operation of entering values contained in bank 218 into the proper orders of bank 242 through the diagonal pattern 226 is the same in multiplication as it is in division, wih the exception that in division, bank 242 is conditioned for subtraction. The entry of such values into bank 242 is controlled by operation of the solenoid 352.

In division, solenoid 352 is controlled by the diagonal aligning of the highest value order of the dividend bank with the highest value order of the divisor bank. This alignment is attained through the diagonal pattern 226 of drum 228. In division, bank 254 receives a value every time an entry is made from bank 218 to bank 242, while in multiplication, a value encountered in any order of bank 254 controls the entry from bank 218 into bank 242.

DELAYED CARRY

The mechanism previously described employs sequential value entry mechanism. In order to demonstrate that the invention is not limited in this manner, an embodiment of the device will be described which does not require sequential entry. The general object and purpose of this further embodiment of the machine is to provide a binary value accumulating device in which the entry of all ordinal values is accomplished simultaneously while delaying the entry of all carry values caused by the entry and accumulation of such ordinal values, and in which all carry values are thereafter entered simultaneously.

The necessity for sequential entry of ordinal values imposes an undesirable time limitation on the operation of value transfer patterns. The process of simultaneous entry of ordinal values is of special utility in combination with the particular type of relay value accumulator previously disclosed, although it may be used with the electronic tube type or other types of accumulators to great advantage. Before describing means for accomplishing the simultaneous ordinal entry followed by simultaneous carry entry, the general method of operation for achieving such a result will be briefly described.

A carry occurs in the binary system when an entry is made in an order in which a value is present. Normally, sequential entry of ordinal values is required because there is no distinction between a carry pulse and the normal operating pulse, and therefore, a time delay must be provided to allow a carry pulse to operate the higher orders of the binary accumulator. The present disclosure, as stated, provides for delay of the carry increments until completion of the ordinal entries, and subsequent simultaneous entry of the carry increments. Taking, for example, the following problem:

```
        1 1 1
plus    1 1 1
   =1   1 1 0
```

In the normal sequential entry system, the values to be added could be entered in the following illustrated fashion:

```
           1 1 1
plus           1
         1 0 1 1
plus         1
         1 1 0 1
plus       1
         1 1 1 0
```

In accordance with the present mode of operation, the various values would be entered as follows:

```
            1 1 1
plus        1 1 1—simultaneously entered in all orders
            0 0 0=condition of register after entry
plus carry  1 1 1   —simultaneously entered in all orders
          = 1 1 1 0
```

Some entries of carry increments will result in a carry, depending on the problem or order of entry, for example, in the normally entered problem above shown:

```
            1 1 1
plus              1—enter lowest order first
          1 0 0 0—carry extends into fourth order through all orders
plus          1
          1 0 1 0—no carry
plus        1
          1 1 1 0—no carry
```

By entering the lowest order first, the carry advanced to the fourth order first and the entry of the units in the second and third orders did not result in a carry.

Taking problems at random and simultaneously entering the ordinal units and then simultaneously entering the primary carry units, it will be seen that the entry of the primary carry units sometimes results in a further carry, but the resultant carry never enters an order which is receiving a primary carry, as will be explained.

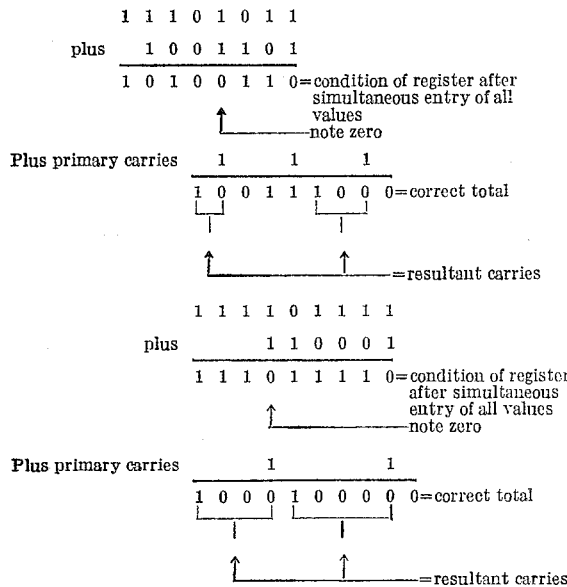

A study of the two problems above will show that the delayed primary carries, when entered, produce resultant carries, but in such a case, the resultant carry never enters an order which receives a primary carry. It will be seen that no resultant carry produced by the entry of a primary carry will encounter another carry, and the primary carries may therefore be entered simultaneously.

The circuits hereinafter disclosed include means for disabling the normal carry during simultaneous entry of all value increments and means for subsequently entering all of the delayed carry increments simultaneously. Thus, in two separate entries, the entire value is accumulated, regardless of the number of orders into which a value is entered.

As previously stated, the particular accumulating relays heretofore disclosed are of particular utility when operated in combination with a delayed carry enter because of their characteristic ability of receiving simultaneous entry and carry. A single operating pulse is applied to the relay into which the entry is being made, and if that relay is already in an operated condition, the same pulse is directed into the next higher order relay. Thus, a single pulse is directed through all operated relays to the first higher order unoperated relay. Tubes, on the other hand, carry sequentially or in wave form because the actual change of condition of a tube creates the pulse that changes the condition of the next higher order. This is a very fast operation but the required time for a carry wave must be allowed between successive problem entries, and sometimes allowed between successive ordinal entries depending on whether the ordinal entries, which are entered sequentially, are entered in the highest order first and successively to the lower orders, or to the lowest order first and successively to the higher orders. Entry into the highest orders first does not require a wait for the carry wave between ordinal entries, but since the lowest order entry may produce a carry wave, the wait must be provided before the first entry in the next problem. Entry into the lowest order first requires a wait for a possible carry wave between each ordinal entry of each problem.

*Relay embodiment*

Figure 13:
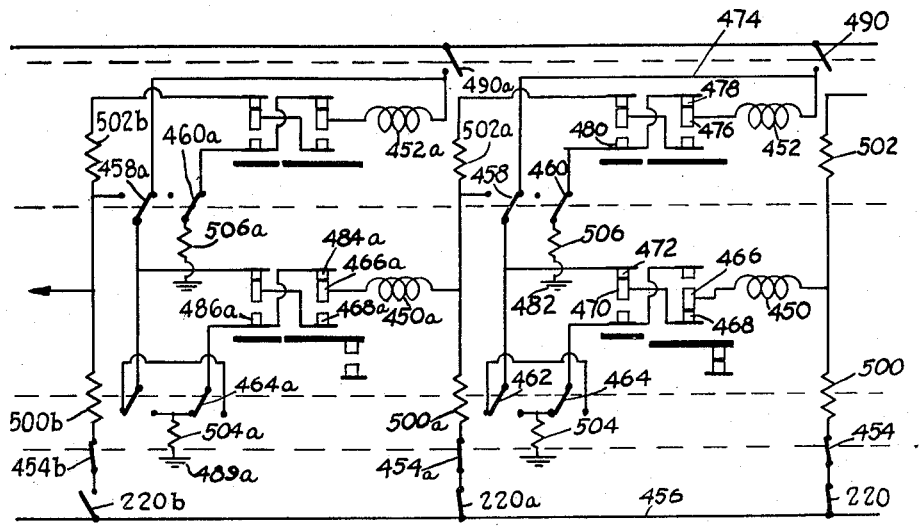
Figure 13 is a circuit diagram for interconnected counter relays adapted to delay carry value entry.

Means for delaying the simultaneous carry entry may consist of any device for registering the carry and subsequently by-passing a pulse through all of such operated registers and directing the pulse to the next higher unoperated order. The means described in this embodiment comprises a set of the same type of binary relays disclosed previously for the accumulator. These relays have a large and small armature, as more fully described in my above-mentioned co-pending application, the means for connecting the leads for the desired operation being shown in Figures 13 and 14. A coil 450 constitutes the coil of the regular value relay in the lower order and a coil 452 constitutes the coil of the ordinally related carry relay in the lower order. Similarly, a coil 450a and a coil 452a constitute the coils of the value relay and the carry relay, respectively, in the next higher order. Figure 13 shows the lower order relay (on the right) as containing a value, that is, in the latched condition, and the next order as containing no value. Both armatures of the carry coils 452 and 452a are in the unoperated condition. A respective selectively operable switch 220, 220a, etc., is provided for making value entries into each of the various orders of the accumulator from a lead 456. A respective pair of switches 458, 460 and 458a, 460a in each order constitute means for enabling and disabling the normal carry and directing a carry pulse to the correct order, as will be explained, and a respective pair of switches 462, 464 and 462a, 464a in each order are provided for conditioning the related order for the performance of addition or subtraction, according to the manner previously described.

A pulse applied to lead 456 enters values into both of the accumulating relays 450 and 450a, taking the following path (Figure 13): In the lowest order (this order already contains a value) through switch 220, a normally closed switch 454, a resistor 500, coil 450, a series of relay contacts 466, 468, 470 and 472, switch 458, a lead 474, carry coil 452, a series of relay contacts 476, 478, and 480, switch 460 and a resistor 506 to ground 482. In the next accumulating order (to the left in Figure 13), the pulse is through switches 220a and 454a, resistor 500a, the second order coil 450a, relay contacts 466a, 484a and 486a, switch 464a and a resistor 504a to ground 489a. Coil 452 in the lower order is therefore operated to store a carry value because of the presence of a value in coil 450 at the time of entry of another value, and coil 452a of the higher order is not operated.

Figure 14:
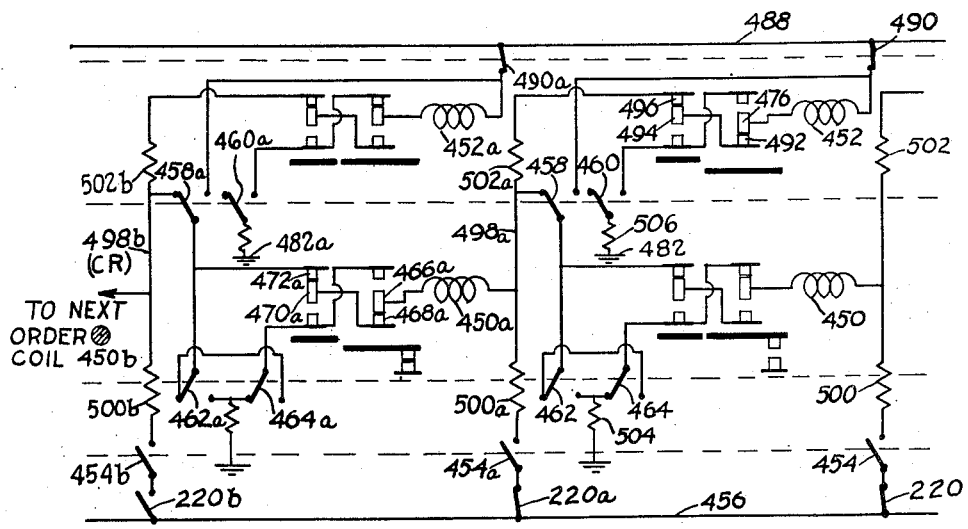
Figure 14 illustrates another operative condition of the system of Figure 13.

Figure 14 shows a manner of entering the carry values stored in coils 452, 452a, etc., all of which are entered simultaneously in response to a pulse applied from a lead 488. It will be noted that switch pairs 458, 460 and 458a, 460a have been operated to enable the normal carry of the accumulator line in which the coils 450 and 450a are located and to disable the ground connections 482 and 482a of coils 452 and 452a. It is also to be noted that a series of ordinal switches 490, 490a, etc., from lead 488 are closed and switches 454, 454a, etc., are open. A pulse applied to lead 488 energizes any coil 452 which is in an operated condition and also operates the next higher order accumulator coil 450, 450a, etc. Since the normal carry in the accumulator line has been enabled, any entries coming through this line will carry to the higher orders if a value is present. For example, the carry pulse through coil 452 in the lowest order is directed to the second and third order coils 450a and 450b (second order coil 450a contains a value entered at the same time as the lowest order entry through lead 456). The path is as follows: lead 488, switch 490, coil 452, contacts 476, 492, 494 and 496, a resistor 502a, a lead 498a, the second order accumulator coil 450a, relay contacts 466a, 468a, 470a and 472a, switch 458a to lead 498b and the accumulator coil 450b of the next higher order. The second order carry coil 452a was not operated, it being noted that with the ground connections (switches 460 and 460a) broken, a pulse from lead 488 is ineffective to operate those carry relays which are not already in an operated condition. The lowest order carry coil 452, however, was operated twice, once as a result of the carry from its associated accumulator relay 450 and the second time from lead 488. This coil is therefore in an unoperated or clear condition after the carry operation has been effected.

It will be noted that resistances 500, 502, 504 and 506 are placed in the circuits of Figures 13 and 14. Their purpose is to keep the same resistance value in the line regardless of how many relays are operated at one time. For example, there may be one or ten relays operated in series in a ten relay accumulator. In order to keep the line voltage constant it is necessary to keep the series resistance the same for the various conditions encountered by a value pulse or a carry pulse entered into various orders of the accumulator. Resistances 500 and 502 are therefore of progressively higher value in higher orders, while the resistances 504 and 506 are of progressively lower value in higher orders. The resistances 500 and 502 for any order have a resistance equal to the total internal resistances of all the preceding or lower order relays, while the resistances 504 and 506 for any order have a resistance equal to the total internal resistance of all the succeeding or higher order relays.

It will be seen from the foregoing that means may be provided to disable normal carry during ordinal entry of values, to store primary carry values, to re-enable the normal carry, and to enter the delayed primary carry values, thereby causing undelayed simultaneous entry of resultant carry values. Therefore, the entry of the ordinal values may be accomplished simultaneously and the entry of the delayed carry values may be accomplished simultaneously, and plural order binary values may be thereby accumulated in response to only two operating pulses.

*Electronic embodiment*

Electronic means, utilizing the foregoing mode of operation for simultaneously entering all ordinal values, delaying the resulting carry and subsequently entering all carry values simultaneously without delay of any carries resulting from entry of carry values, is shown in Figure 18.

The accumulator line consists of a plurality of accumulator stages comprising double triodes A and B in each stage, with an intermediate carry stage comprising a double triode C and D between each two accumulator stages. The double triodes C and D constitute the means for registering the carry and are substantially like the triodes A and B of the accumulator shown in Figure 16. The interstage carry pulse which appears on lead 32 when section B starts to conduct, as previously described, is directed through a lead 56 to the associated carry stage C, D. Normally, section D is conducting, but a carry pulse reverses the carry stage so that section C is conducting. Thus, all carries which occur due to an input pulse through lead 58 and ordinal selective switches 60, are registered in the carry stages. Immediately after the input pulse for ordinal entry, a switch 62 is closed, which, in effect, resets the carry stages so that all D sections conduct. Any carry stage which contains a carry value therefore changes state to section D conducting and generates a carry pulse at a lead 64 to the next higher accumulator stage. The closure of switch 62 biases each section C so as to lock each carry stage with section D conducting. Therefore, any resultant carry pulse generated in an accumulator stage which contains a value when it receives a primary carry, goes through the related carry stage, undelayed, to the next accumulator stage during this carry process. Entries are made into the accumulator, therefore, with two pulses, one applied to lead 58 through selective switches 60 to enter all ordinal values, and the other applied to lead 66 through switch 62 to enter all carry values.

It will be understood that switches 60 and 62 are not necessarily mechanical switches but may be electronic "gates" or other types of electronic selective conducting devices. Mechanical switches, however, may be used advantageously to enter amounts from a decimal keyboard into a binary register, as will be hereinafter explained.

As in the circuit of Figure 16, a lead 38 is provided to reverse all accumulator stages AB, to thereby condition the circuit for subtraction or addition. During this change, carry values should not be entered into the carry stages. A triple-pole switch 68 is effective when closed to, among other things, bias all carry stages through lead 66 to prevent section C from conducting. The duration of the negative pulse applied to the accumulator stages through lead 38 should be sufficient to prevent a possible carry pulse from reversing an accumulator stage. Means which are provided to register an overdraft consist of an extra double triode 70' with sections G and H, section H being normally conducting.

It is normally not necessary to delay the transfer to the overdraft indicator, but a carry stage 95 is provided between this and the highest stage of the accumulator for the purpose of blocking out a carry pulse during pulsing through lead 38 to condition the accumulator for subtraction. Carry stage 95 also enters a bona fide carry pulse into the lowest accumulator stage, through a lead 98, in order to maintain a true indication of negative or positive values as the accumulator changes to or from overdraft condition. The reversing lead 38 is not connected to stage 70', so a wide pulse on that lead does not overcome a carry pulse which may enter stage 70' during a reversal of the accumulator. Therefore, the blocking of a carry pulse which may occur during the pulsing through lead 38 is accomplished by means of a small resistor 69 in the carry stage 95. Resistor 69 is connected to ground 71 through the switch 68 and provides sufficient bias to prevent a carry to the overdraft register 70'.

Any carry from the highest accumulator stage occurring during accumulation is delayed if it results during initial entry and is entered as a fugitive 1 into the lowest accumulator stage, as well as stage 70', during the carry phase, or a carry will pass through stage 95 to the lowest accumulator stage without delay if it is the result of a carry from a lower order. An indicator lamp 30 in stage 70' glows if section G is conducting, which condition indicates an overdraft. This lamp will also glow if the capacity of the register is exceeded. Addition of an amount sufficient to offset the overdraft results in another carry to tube 70' and section H again conducts, thereby extinguishing the overdraft indication, and since the overdraft correction can occur only during addition, the pulse to the lowest order cancels the fugitive 1 supplied thereto when the overdraft condition was attained.

Means are also provided to indicate whether the accumulator is conditioned for addition or subtraction. This means comprises a further double triode stage 72 having sections E and F. Stage 72 is substantially the same as the other stages but is provided with two indicator lamps 74 and 76. Normally, section F is conducting and indicator lamp 74 is glowing which indicates that the accumulator is conditioned for addition. A pulse applied to lead 38, thereby changing all orders, as previously explained, is directed to stage 72 and changes the condition thereof so that section E conducts, thereby indicating that the accumulator is conditioned for subtraction. A second pulse applied to lead 38 reconditions the accumulator for addition and changes the condition of tube 72 so that section F conducts and indicates addition.

All of the accumulator and carry stages may be reset to their initial conditions by applying a bias through a reset switch 78 which is connected to ground.

MODIFIED PATTERN SYSTEM

Figure 15:
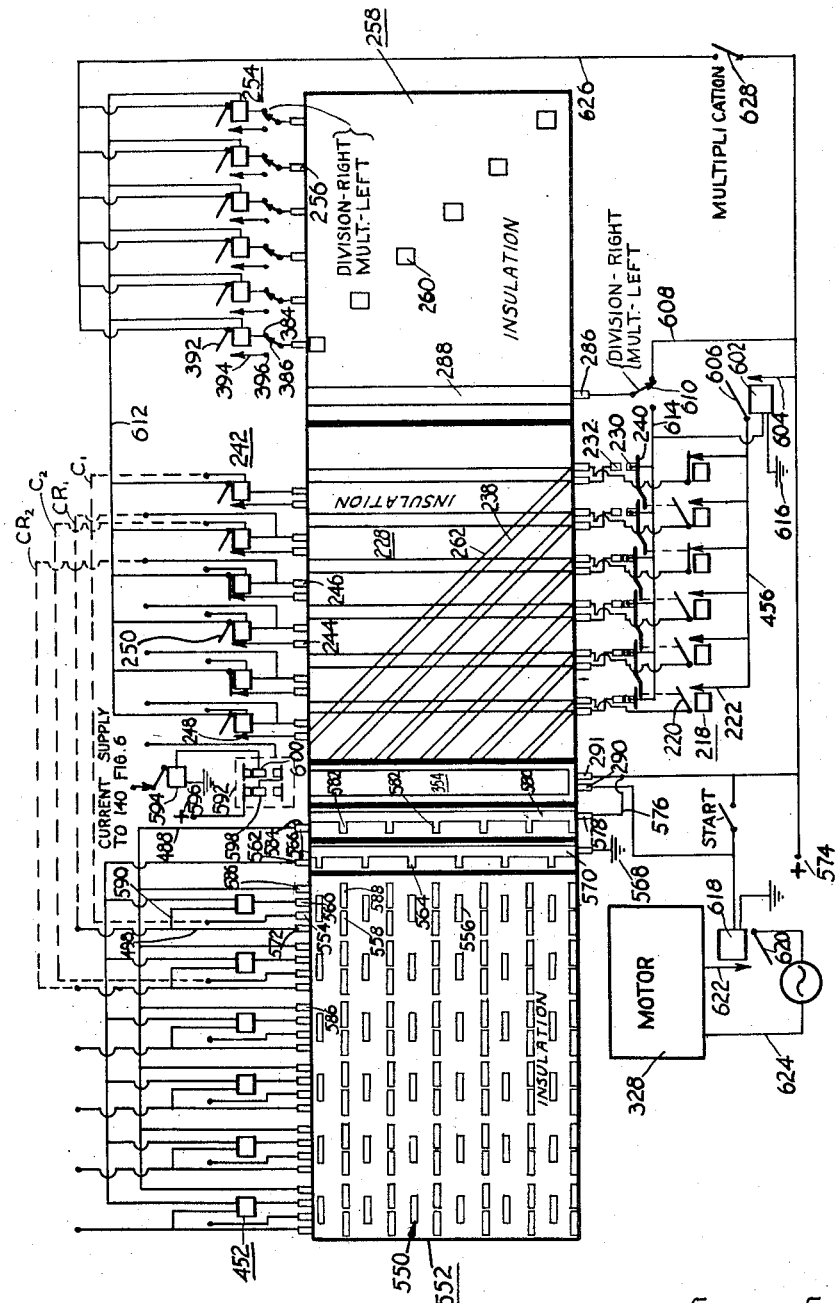
Figure 15 is a general schematic view of a modified form of the calculator embodying the carry-value delay concepts illustrated in Figures 13–14.

The performance of multiplication and division through a combination of pattern contacts by one rotation of a pattern drum is made possible by employing the equivalent of the delayed carry system shown in Figures 13 and 14, the overall arrangement for multiplication and division with this novel carry system being shown, somewhat schematically, in Figure 15. The basic auxiliary switching functions which have previously been described as necessary to the performance of multiplication and division, are performed, in the present embodiment, through a switching pattern 550 carried by a new drum 552. Reference will be made hereinafter to the equivalents, in Figure 15, of the various switches and leads of Figures 13 and 14, while reference numerals previously used for drum sections and relay banks of Figure 3 are used when conveniently possible in the system of Figure 15. A value entry lead 456 (see also Figures 13 and 14) for the divisor or multiplicand bank 218 has been provided in the system of Figure 15. Otherwise, bank 218, drum 228 and its pattern 226, the quotient or multiplier bank 254 and drum 258 and its pattern contacts 260 are all essentially the same as their described counterparts shown in Figure 3. A bank of relays 452 is provided for the delayed but simultaneous entry of carry values, and the pattern 550 of drum 552 is provided to cooperate with bank 452 to effect the switching operations shown and described for the carry system of Figures 13 and 14.

It will be recalled that switches 458 and 560 of Figures 13 and 14 are alternately moved, first to one position during ordinal entry, and then to another position during carry entry. Switch 458 is connected to lead 474 and therefore to coil 452, during the ordinal entry. In Figure 15, the carry leads from contacts 466 (see Figure 13) for the relays of bank 242 are designated as $C_1$, $C_2$, etc. Each of these leads is connected to a sensing finger 554 in contact with drum 552, and is alternately switched from a contact 556 to a contact 558 during rotation of drum 552. When a finger 554 is in engagement with a pattern contact 556, it is connected through that contact to a finger 560, which, in turn is connected to the coil of the ordinally related relay in bank 452. Therefore, if a carry lead $C_1$, $C_2$, etc., is energized, an associated relay in the bank 452 is operated to store a carry value. As this occurs, a finger 562 is on a conducting portion 564 of a drum section 566, thereby connecting the operated coil 452 to ground 568 through a conducting portion 570. At approximately the half-way point in each step of rotation of drum 552, the finger 554 engages a pattern contact 558 and a carry pulse is directed from finger 554 through contact 558 to a finger 572, also in engagement with contact 558, and this carry pulse passes to the carry return lead 498 shown in extension as $CR_1$, $CR_2$, etc. (see also Figure 14). Thus, energization of a carry lead $C_1$, $C_2$, etc., first operates a carry relay 452 associated therewith, and later, upon further rotation of drum 552, the next higher relay of bank 242 is energized.

In Figures 13 and 14, switches 490 are shown as being open during the value entry and closed during the carry entry, at which latter time a pulse is supplied from lead 488, which pulse passes through the coil 452 of each operated carry relay and reaches lead 498. In the embodiment shown in Figure 15, the carry entry operation is performed by a pulse from a current source 574 through a lead 576, a finger 578, a conducting drum portion 580, a conducting drum portion 582, a finger 584, lead 488 (see Figures 13 and 14), a finger 586, a pattern contact 588, finger 560, the coil of a relay in bank 452, and a lead 590, to the carry return lead 498. It will thus be seen that all the switching necessary in Figures 13 and 14 is provided by the drum 552.

The balance of the operation of the embodiment shown in Figure 15 is substantially the same as for the embodiment shown in Figure 3 and related figures. It is pointed out, however, that the quotient bank 254, which is in coooperative relation with the pattern contacts 260, may be provided with carry connections similar to those previously described in relation to the dividend bank 242. No delay in carry would be necessary for bank 254 because only one order relay operates at one time, but normal carry should be provided as it would be effective to subtract the entry when an overdraft has occurred, and this may operate, through the same switching arrangement, to add back a divisor in the next lower set of dividend orders. When an overdraft occurs, a highest order dividend relay 592, which is provided as an extra relay in the manner of relay 264, previously described, stands in an operated condition. This is effective to operate a solenoid 594 from a source 596 through contacts 598, associated with the small, or control armature of relay 592 and contacts 600, associated with the large armature of relay 592. The solenoid 594 changes all connections for addition by controlling solenoid 140 shown in Figure 6. The solenoid 140 also is provided with connections for subtracting a value from the quotient bank 254 to correct the value added in the prior order.

As in the previous embodiment, the highest order divisor relay of bank 218 to contain a value breaks the contacts 230 and 232 for the relays of the lower orders, and the highest value order of bank 218 is related through the diagonal pattern strips 238 to the highest value order of bank 242, thus completing a circuit through finger 244, which circuit is effective to operate a relay 602 to thereby close a pair of contacts 604 and 606, and enable a pulse to be supplied from current source 574 to lead 456, which in turn enters the divisor into the proper orders of the accumulator bank 242. The division circuit is as follows: current supply 574, contact 608, switch 610, finger 286, drum strip 288, pattern contact 260, finger 256, the ordinally related relay of bank 254, a lead 612 which is a common return lead, contacts 250 and 248 of the highest value order in bank 242, the related diagonal pattern strip 238, contacts 232 and 239 of the highest value order in bank 218, leads 614, relay 602, and ground 616. This enters the quotient in bank 254, and closes contacts 604 and 606 to allow a pulse to be supplied from source 574 to lead 456, all closed ordinal contacts 222 and 220, and the related diagonal pattern strips 262, fingers 246 and relays of bank 242. As previously described, pattern 552 effects the correct switching in timed relationship to these operations. The pattern 552 makes one complete rotation and stops when the motor contacts 290 and 291 reach the non-conducting portion of strip 354, thereby disconnecting current source 574 from a relay 618 to break a pair of contacts 620 and 622 in the motor circuit.

Multiplication in the present embodiment is performed by throwing switch 610 to lead 614 and enabling a lead 626 by closing a multiplication switch 628. The circuit is then from current source 574 through switch 628, lead 626, the proper ordinal set of contacts 392, 394 and 396, switch 386 (which will have been moved to the left as by the closing of a switch similar to 398, shown in Figure 12, to energize a solenoid, such as 402, and thereby change all connections of switches 386 from the division position to the multiplication position), finger 256, drum contact 260, strip 288, finger 286, switch 610, lead 614, and relay 602 to ground 616. This enters values set up in the multiplicand bank 218 into the proper ordinal relays of the product bank 242 through the following path: source 574, contacts 604 and 606, lead 456, all of the closed ordinal contacts 222 and 220, and the related diagonal strips 262, fingers 246 and relays of bank 242, as previously described. Thus, when a multiplier is set up in bank 254 and a multiplicand in bank 218, the product is accumulated in bank 242 with one turn of the pattern drums.

The switches 458 and 460 of Figures 13 and 14 are operated so that a carry, whether plus or minus, is delayed by entry into the carry coils 452, etc., and is thereafter properly entered into the accumulator coils. The switching pattern 550 is effective to correctly enter plus or minus carry values according to whether the associated accumulator relay bank is in the add or subtract condition. It is noted that a switching system, such as that shown in Figure 6 may be substituted for the switching pattern 550.

ALTERNATIVE VALUE ENTRY SYSTEM

Figure 20:
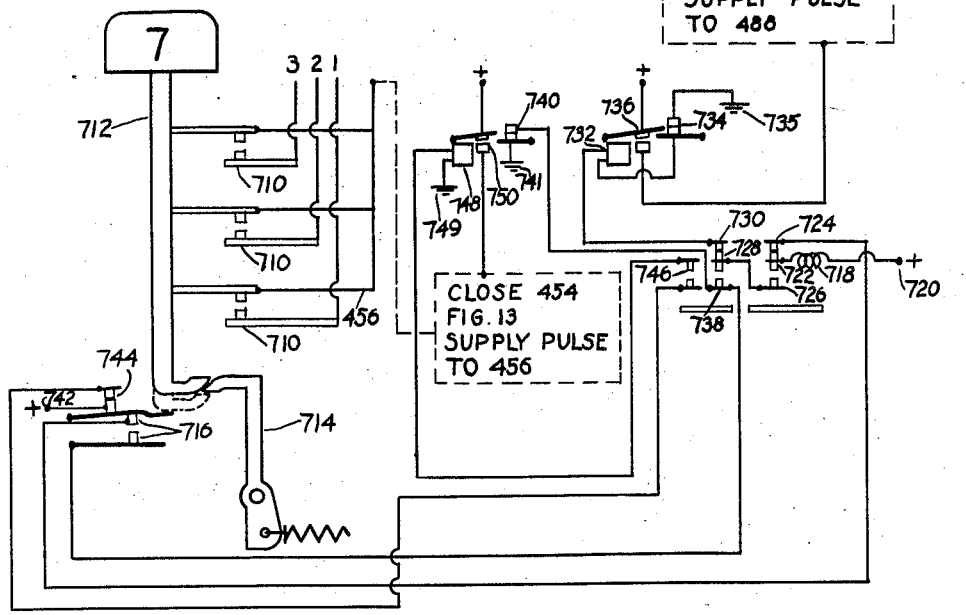
Figure 20 is a schematic showing of the basic value entry control system adapted for use in conjunction with the value entry system of Figure 19.
Figure 19:
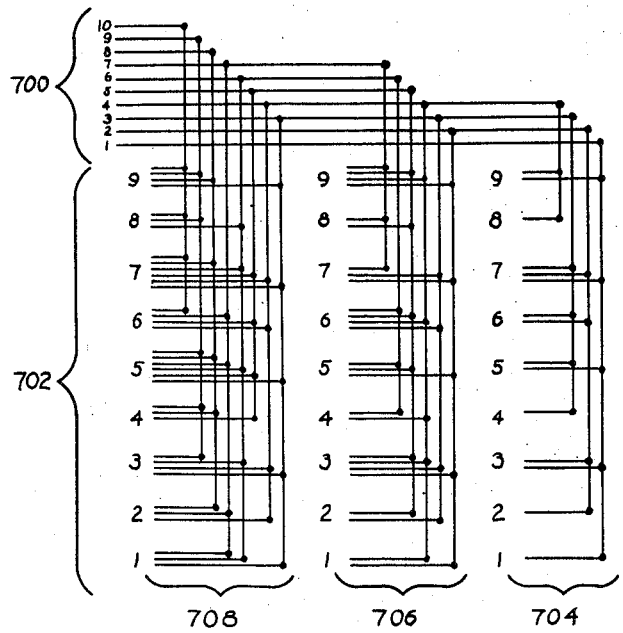
Figure 19 is a circuit diagram illustrating a preferred mode of entering binary values into a binary value counter or register.

A method of entering decimal values into a binary value register is shown in Figures 19 and 20. Figure 19 is a circuit diagram showing a set of leads 700 to the various orders of a binary register, which may comprise relays or tubes. A keyboard 702 is of the full decimal keyboard type and shows the connections of the units order 704, tens order 706, and hundreds order 708. The connections of each key are directed to the binary orders representative of the decimal value of the key. Closure of the "1" key in the units order 704, for example, closes a contact on a lead which directs a pulse to the lowest binary order; closure of the "2" key directs a pulse to the second binary order; and closure of the "3" key directs a pulse to both the first and second binary orders. If the modified binary system, as described in my co-pending application, is used, this pattern may be repeated in the thousands, ten thousands and hundred thousands orders.

The keys are all alike except as to the contacts made, and the detail of the "7" key in the units order is shown in Figure 20. There are three sets of contacts 710 leading to the first, second and third binary orders, in accordance with the binary equivalent (111) of the decimal 7. Depression of the key 712 to latched position (shown in broken lines) in cooperation with a latch 714 closes all contacts 710. In this position, the contacts may be considered to show in detail the closed selective switches 220, 220a, etc. (Figures 13 and 14). Means are provided to initiate a pulse to the value entry lead 456 and subsequently to the carry entry lead 488 upon the full depression of any key. The orders should be interlocked, by means not shown, so that a key in only one order may be fully depressed at one time. The pulsing is initiated by the closing of a pair of contacts 716 upon full depression of numeral key 712. This operates a relay 718, of the type described in my co-pending application, which carries two armatures, one of which locks in response to a first operating pulse and releases in response to a second operating pulse. The closing of contacts 716 completes a circuit from a source 720 through coil 718, large armature contacts 722 and 724, contacts 716, small armature contact 738, and a contact 740, to ground 741. As both armatures of relay 718 go down in response to energization of that relay, a circuit is closed from source 720 through coil 718, and contacts 722, 726, 728, 738 and 740 to ground and constitutes a holding circuit (for coil 718) which remains closed as long as the key 712 is held depressed. Upon release of the key to the latched position shown in broken outline, a pair of contacts 744 become closed to complete a circuit from a source 742 through a pair of contacts 744, a pair of contacts 746, and a solenoid 748 to ground 749. Operation of solenoid 748 breaks the holding circuit for relay 718 by opening contacts 740 and also supplies current through a pair of contacts 750 to close the contacts 454 (Figure 13) and supply a pulse to lead 456 to simultaneously enter all binary values associated with the "7" key. The small armature of relay 718 returns to its upward position as the result of the breaking of contacts 740, and a new circuit is completed through coil 718 (constituting the second input pulse to this coil), contacts 722 (large armature locked down) 726, 728 and 730, a solenoid 732, and a pair of contacts 734 to ground 735. Operation of solenoid 732 breaks contacts 734 to thereby release the large armature of relay 718 and also closes a pair of contacts 736 to supply current for closing switches 490 (Figure 13) and to supply a pulse to lead 488. The return of relay 718 to the unoperated position shown in Figure 20 indicates the completion of the value entry and the key 712 is thereafter held in a partially depressed or latched position. All keys 712 may be released at once by a common clear bail, not shown.

From the foregoing it will be understood that I have provided a mechanism adapted to the performance of addition, subtraction, multiplication and division in the binary system, and that the present invention, when taken with the invention of my above-mentioned copending application constitutes what may be considered to be a complete binary calculator.

Since it will be obvious to those skilled in the art that the arrangements and forms of various of the parts, elements, and combinations thereof of the above-described embodiments of my inventions may be varied or modified, it is to be understood that the scope of the subject inventions is to be limited only by the spirit thereof and the scope of the appended claims.

What I claim as new and desire to secure by Letters Patent is:

1. In a binary system calculator, the combination of first, second and third binary value registering means each having a plurality of value entry units representative of a series of sequential binary orders, and means interconnecting said registering means to enable the division of a binary value in said first means by a binary value in said second means to obtain a binary value quotient in said third means comprising a selectively positionable member, sensing means for each of the value entry units of said first registering means in engagement with said member, sensing means for each of the value entry units of said second registering means in engagement with said member in spaced relation to said first sensing means, a sensing pattern carried by said member in sensing relation with the sensing means for said first and second registering means, said pattern embodying means operable upon selective positioning of said member to connect the highest operated value entry unit of said second registering means with the highest operated value entry unit of said first means and to connect successively lower units of said second means with the correspondingly lower units of said first means, other sensing means operable in time relationship to the selective positioning of said member to enter a quotient value in that order value entry unit of said third registering means corresponding to the lowest connected order value entry units of said first and second means, and means forming an operable connection between said first and second value registering means operable to subtract the value in said second means from the value in said first means.

2. In a binary system calculator, the combination of first, second and third binary value registering means each having a plurality of counter units representative of a series of sequential binary orders, and means interconnecting said registering means to enable the multiplication of a binary value in said first means by a binary value in said second means to obtain a binary value product in said third means comprising sensing means for the counter units of said second registering means, a first pattern in selectively positionable engagement with said sensing means embodying signal receiving contacts operable to sequentially engage the sensing means of the counter units of said second registering means and to transmit a value signal when sensing means for a value-containing unit is engaged, means responsive to the receipt of said value signal to cause the series of value-containing counter units of said first means to transmit a series of value signals representative of the value contained in said first means, a movable second pattern means in sensing relation to said first and third means and positionable in response to the positioning of said first pattern operable to relay said transmitted value signals from said first means to counter units of said third means which are offset order-wise from the transmitting counter units of said first means in proportion to the position order-wise in said second means of the counter unit which transmitted said initial value signal, and means associated with said third means to accumulate binary values represented by successive series of signals transmitted from said second means.

3. In a mechanism adapted for the performance of binary system calculation, the combination of a cyclically movable sensing pattern comprising a plurality of electrical contact so disposed as to be representative of binary value components of sequential decimal system numbers, binary value accumulator means comprising sensing means in scanning relation with said pattern and adapted to enable the completion of an electrical circuit through said accumulator means and pattern when the value condition of said accumulator means is matched with the pattern contacts corresponding to said value condition, a second cyclically movable pattern of similar contact configuration and binary value accumulator means therefor, the contacts of said second pattern being in offset relation to their associated accumulator means in relation to the positional association of the contacts of said first pattern to said first accumulator means, and means responsive to the matching of the value condition of the first accumulator means with contacts of said first pattern upon the completion of said circuit to operate through the corresponding contacts of said second pattern the units of said second accumulator means positionally associated therewith and thereby enter a cumulative value in said second accumulator means which is in relation to the value in said first accumulator means in proportion to the degree of offset of said patterns.

4. In a binary system calculator, the combination of a selectively positionable member, first and second binary value registering means associated with said member having sensing fingers in spaced wiping relation with said member, a third binary value registering means, and means so inter-relating said first, second and third value registering means as to enable the division of a binary value in said first means by a binary value in said second means to obtain a binary value quotient in said third means comprising a sensing pattern carried by said member having a plurality of spaced electrical contact strips in diagonal parallel relation operable upon the selective positioning of said member to electrically relate the highest operated order unit of said second means with the highest operated order unit of said first means, sensing means operable in timed relationship to the selective positioning of said member to enter a quotient value in said third value registering means, and means forming an electrical connection between said first and second value registering means operable to subtract the value in said second means from the value in said first means.

5. A binary value calculator comprising first, second and third banks of counter units, there being a unit in each bank for each of a series of sequential binary orders, and each unit embodying means indicative in one position of a no-value condition for said unit and in another position of a value condition, value entry means for each of said first, second and third banks of counter units, selectively movable calculator means forming a variable interconnection between said banks of units adapted to so relate the values in said banks that the final values in said first and second banks are factorial binary values of the value in said third bank, said calculator means including a pattern forming an interconnection between said second and third banks embodying diagonally orientated contact strips providing for selective value relating and value transmitting connection between any given unit of said second bank and any given unit of said third bank in accordance with the positioning of said pattern, control means including means associated with said first bank adapted in one position of operation to multiply the value in said second bank by the value in said first bank, the product value being introduced through said pattern into said third bank, and adapted in another position of operation to divide the value in said third bank by the value in said second bank to provide a quotient value in said first bank, means associated with at least the units of said third bank enabling the carry of values from one operated unit to the next higher unit upon the input of another value to said operated unit, said carry means being operable when said control means is in said condition for multiplication, and switch means for said carry means operable to enable said carrying means, upon the entry of a value into a non-operated unit, to change the next higher operated unit to a no-value condition and change the condition of said unit receiving said value and all higher units intermediate said unit and said higher operated unit to a value condition, said switch means being operable when said control means is in said condition for division.

6. The binary value calculator of claim 5 wherein means are provided in association with said third bank operable to receive and store said carry values, and movable switch means forming a selective connection between the units of said third bank and said carry value receiving means operable after the storing of said values to enable the transfer of said values to the units of said third bank.

7. The binary value calculator of claim 6, wherein means are provided under the control of an overdraft operation of the units of said third bank, resulting from the subtraction of the value of said second bank from a lesser value represented by the condition of the third bank units with which said value units of said second bank are connected, to operate said switch means for said carry means to effect, when the next operating position of said pattern is reached, an addition of the second bank value to the third bank units with which said value units of said second bank are then connected, and thereby remove said overdraft.

8. In a mechanism adapted for the selective performance of addition and subtraction of binary values including a first line of a plurality of value receiving units normally conditioned for additive carry to perform addition and a second line of a plurality of value receiving units normally conditioned for subtractive carry and adapted to indicate the reflected complement of a value in said first line of units, means for entering an absolute minuend value into said first line of units, control means operable to invert the carry conditions of said first and second lines of units by conditioning the second line for additive carry and the first line for subtractive carry to indicate in said first line the reflected complement of a value in said second line, and value input means for the additive introduction of an absolute subtrahend value into said first line of units, the reflected complement value in said second line of the resultant summative value in said first line being the absolute difference between said minuend value and said subtraheand value.

9. A binary value registering system comprising a series of at least seven bistable stages representative of a corresponding continuous series of conventional binary orders; means correlating each two successive stages and adapted to store the binary carry values resulting from value input to said stages; means operable, after the entry of ordinal values to said stages, to enable the transfer of said carry values from said carry value storing means to said stages; and a value entry system comprising: a keyboard having keys corresponding to all of the numbers of at least two orders of the decimal system, circuit means associating each key with such of the binary stages as are conventional-binary components of the decimal number represented by the key; first pulsing means responsive to the depression of any given key to direct an ordinal value input pulse to each binary stage associated with said key; second pulsing means; and control means therefor operable, in response to the operation of the first pulsing means, to operate said second pulsing means and direct a pulse to the carry value storing means associated with the binary stages represented by said key and thereby operate said transfer means.

10. A binary value registering system comprising a series of at least seven bistable stages representative of a corresponding continuous series of conventional binary orders; means correlating each two successive stages adapted to store the binary carry values resulting from value input to said stages; means operable, after the entry of ordinal values to said stages, to enable the transfer of said carry values from said carry value storing means to said stages; and a value entry system comprising: a keyboard having keys corresponding to all of the numbers of at least two orders of the decimal system; circuit means associating each key with such of the binary stages as are conventional-binary components of the decimal number represented by the key; first pulsing means responsive to the depression of any given key to direct an ordinal value input pulse to each binary stage associated with said key; second pulsing means; and means to operate said second pulsing means to direct a pulse to the carry value storing means associated with the binary stages represented by said key and thereby operate said transfer means.

11. A binary value register comprising carry type counter means representative of a series of binary orders, means associated with said counter means adapted to store the carry values resulting from value input to said counter means, means operable after the entry of ordinal values to said counter means to enable the transfer from said carry value storing means to said counter means of said carry values, and a value entry system comprising: a keyboard having keys corresponding to numbers of the decimal system, circuit means responsive to the depression of a selected key to operate a control relay having main and control armatures, latching means for said key operable upon the semi-return of the same to latch said key, circuit means responsive to the return of said key to its latching position and to the operation of both armatures of said control relay to energize a solenoid, contact means carried by said key in association with fixed contacts and in circuit closing engagement with the same when said key is in its latched position to enable the transmission of an ordinal value pulse to each of the binary orders of said counter means which are binary factors of the decimal number represented by said key, pulse supply means operable upon the energization of said solenoid to transmit ordinal value pulses through said contact means to said factorial binary orders of said counter means, said carry value storing means being operable to store any carry values resulting from said ordinal value pulse entry, control means operated by the energization of said solenoid to enable the restoration of the control armature of said relay, circuit means responsive to the restoration of said control armature to energize a second solenoid and said control relay, circuit means operable upon the energization of said second solenoid to transfer said stored carry values from said carry value storing means to said counter means, and means responsive to the energization of said second solenoid to enable the restoration of said control relay to its initial condition.

12. For the selective performance of division or multiplication in the binary system, a calculating machine comprising a rotatable drum like member, a first group of binary order value recording units having contact means in linear sensing relation to said member longitudinally thereof, a second group of binary order value recording units having contact means in linear sensing relation to said member longitudinally thereof and in spaced relation to the contact means of said first group, a sensing pattern carried on said member and comprising a plurality of spaced parallel contact strips extending in diagonally disposed relation with respect to said member and adapting said member in a single rotation to contactually relate in sequence the order value units of said first group with the order value units of said second group, beginning with the contactual relation of the lowest order unit of said first group with the highest order unit of said second group and continuing through the relation of the lowest order unit of said first group with the lowest order unit of said second group, and circuit means including selector means adapted in one condition of operation to additively relate the values in said groups of units and in another condition of operation to subtractively relate said values.

13. In a binary calculating machine, first and second drum-like members, first and second groups of binary order value recording units, each group having contact means in space relation with respect to each other, with the contact means for each group of units being linearly arranged longitudinally of said first member, means including a sensing pattern on said first member comprising a plurality of spaced diagonal contact strips adapted to sequentially relate contactually the contact means from the lower to the higher of the units of said first group with the contact means from the higher to the lower of the units of said second group, a sensing pattern on said second member comprising a contact for each of the binary orders represented by said groups of units and means associated therewith comprising sensing fingers adapted to sequentially sweep said contacts and transmit value pulses through the sensing pattern of said first member to units of said second group selectively related positionally by the sensing pattern of said first member to value containing units of said first group, means mounting said first member for rotation, means mounting said second member for rotation, motive power means, first and second clutch means adapted, respectively, to interconnect said motive power means with said first and second members to rotate the same, means responsive to the positional relating of said first group of units with said second group of units through the sensing pattern of said first member to disable said first clutch means and enable said second clutch means, and means operable upon the completion of the sequential sweeping of the sensing pattern of said second member by the sensing fingers associated therewith to disable said second clutch means and enable said first clutch means.

14. In a binary counter system comprising a pair of tubes for each of a plurality of successive binary orders, a discharge circuit for each tube, a power source, and an impedance connecting the power source to the discharge circuit of each tube, with one of any given pair of tubes adapted when in a conducting state to indicate the presence of a value in the particular binary order to which said given pair corresponds, and with the other tube of said pair adapted when in a conducting state to indicate the absence of a binary value in said particular binary order; carry value means forming an electrical interconnection between adjacent pairs of tubes and adapting the counter system selectively for the cumulative additive carry of values and for the cumulative subtractive carry of values, said means comprising a lead connected across the anodes of the tubes of a pair, a condenser and a resistance in series relation in said lead, and switch means connected to the pair of tubes of the next higher binary order and selectively movable between a pair of contacts connected into said lead, one of the contacts of the pair being located at one side of said resistance and the other contact of the pair being located at the other side of said resistance.

15. A binary value register comprising a pair of tubes for each of a series of binary orders, the tubes of each pair being so interconnected that only one tube of the pair may be in a conducting state at any given time, circuit means includnig selector switching means associated with said pairs of tubes and adapted to introduce a value pulse into a selected pair to reverse the condition of conduction thereof and thereby indicate in said pair the presence of a value, circuit means associated with said tube pairs and including another tube pair for each of any two successive first-mentioned pairs and connected across the same, said second mentioned tube pairs being adapted upon the introduction into any of said first-mentioned tube pairs of a second value pulse to receive and store said carry value, and circuit means including biasing means for the second-mentioned tube pairs adapted to be operable upon the completion of entry of ordinal values into said first tube pairs to transmit carry value pulses forwardly into the first, or value tube pairs, said circuit means further including means for thereafter disabling the carry value storing function of said second-mentioned tube pairs, whereby carry values resulting from the transmittal of said stored carry values to the ordinal value tube pairs will not be stored by said second-mentioned tube pairs.

16. A binary value register comprising a double triode for each of a series of binary orders, circuit means including selector switching means associated with said triodes and adapted to introduce a value pulse into a selected triode to reverse the condition of conduction thereof and thereby indicate in said triode the presence of a value, circuit means associated with said triodes and including another double triode for each of any two successive first-mentioned triodes and connected across the same, said second mentioned triodes being adapted upon the introduction into any of said first-mentioned triodes of a second value pulse to receive and store said carry value, and circuit means including selector switching means adapted to be operated upon the completion of entry of ordinal values into said first triodes to transmit carry value pulses forwardly into the first, or value triodes, and to thereafter disable said second-mentioned triodes.

17. The binary value register of claim 16 further provided with a negative pulsing lead connected across said first triodes and to the anodes thereof and adapted upon the transmission of a pulse therethrough to change the condition of said first triodes from one of additive or forward value carry to one of substractive or rearward value carry, and biasing means for said second or carry value storing triodes adapted to prevent a change in conducting condition of said second triodes during the transmission of said pulse through said negative pulsing lead.

18. The binary value register of claim 17, embodying an additional double triode in said line of second mentioned triodes having an anode connection with said negative pulsing line, and indicator means connected to the anodes of said triode adapted to visually indicate the subtractive or additive condition of said first-mentioned or ordinal entry triodes.

19. A binary value register comprising a first series of double triodes, one for each of a group of successive binary orders, circuit means including selector switching means associated with said triodes and adapted to introduce a value pulse into a selected triode to reverse the condition of conduction thereof and thereby indicate in said triode the presence of a value, circuit means associated with said triodes and including a second series of double triodes, each of said second triodes being connected across two successive triodes of said first series, said second series triodes being adapted upon the introduction into any of said first triodes of a second value pulse to receive and store a carry value by a change in conduction condition, circuit means including selector switching means adapted to be operated upon the completion of entry of ordinal values into said first triodes to transmit carry value pulses into the associated first triodes, overdraft indicating means including an additional triode for said first series and an additonal triode for said second series having a connection across the highest order first series triode and said additional first series triode, said additional second series triode being adapted when in a carry value indicating condition and upon the operation of said third-mentioned circuit means to transfer a value pulse to said additional first series triode, and indicator means responsive to the transfer of said pulse to said overdraft triode to visually indicate the overdraft condition.

20. A binary value register comprising a first series of double triodes, one for each of a group of successive binary orders, circuit means including selector switching means associated with said triodes and adapted to introduce a value pulse into a selected triode to reverse the condition of conduction thereof and thereby indicate in said triode the presence of a value, circuit means associated with said triodes and including a second series of double triodes, each of said second triodes being connected across two successive triodes of said first series, said second series triodes being adapted upon the introduction into any of said first triodes of a second value pulse to receive and store a carry value by a change in conduction condition, circuit means including selector switching means adapted to be operated upon the completion of entry of ordinal values into said first triodes to transmit carry value pulses into the associated first triodes, overdraft indicating means including an additional triode for said first series and an additional triode for said second series having a connection across the highest order first series triode and said additional first series triode, and having a connection with the lowest order triode of said first series, said additional second series triode being adapted when in a carry-value indicating condition and upon the operation of said third-mentioned circuit means to transfer a value pulse to said additional first series triode to thereby cause said triode to change its conduction condition and indicate the presence of an overdraft in said register, and to transfer a value pulse to said lowest order triode to maintain a true indication of values in said register, and means operable upon the input to said register of an overdraft-correcting value to transmit a pulse from said additional second series triode to said additional first series triode and to said lowest order first series triode to extinguish the overdraft condition and to restore a compensating pulse to said lowest order triode.

21. In a binary register having; a series of binary value stages, each of said value stages having two conditions of operation representing, respectively, the absence and presence of a value and being operable upon receipt of a value pulse to reverse its condition of operation; and means for introducing value pulses into said series of stages; the combination of; a respective ordinal carry stage corresponding to each value stage; means operable upon the receipt of a value pulse in any value stage, when said value stage is in its value condition, to operate the corresponding carry stage and thereby store a carry value; a normally inactive carry circuit interconnecting each carry stage to the higher order value stages and effective, upon being activated, to immediately reverse the condition of each higher order value stage up to and including the closest higher order value stage which is in a value condition; first switch means operable, after entry of ordinal values into the value stages, for supplying an operating pulse to the carry stages to (1) activate the carry circuit associated with any operated carry stage, and (2) convert any operated carry stage to its non-operated condition; and second switch means operable, after said entry of ordinal values and before said operation of the first switch means, to disable activation of the carry circuit associated with any unoperated carry stage and to enable activation of the carry circuit associated with any operated carry stage.

22. In a binary register having; a series of binary value stages, each of said value stages having two conditions of operation representing, respectively, the absence and presence of a value and being operable upon receipt of a value pulse to reverse its condition of operation; and means for introducing value pulses into said series of stages; the combination of; a respective ordinal carry stage corresponding to each value stage; means operable upon the receipt of a value pulse in any value stage, when said value stage is in its value condition, to operate the corresponding carry stage and thereby store a carry value; a normally inactive carry circuit interconnecting each carry stage to the next higher order value stage and effective, upon being activated, to immediately transmit to said next higher order value stage a signal for reversing the condition of the latter stage; means interconnecting the value stages for transmitting to the next higher value stage a carry signal from each value stage which is in its value condition when it receives a carry signal; first switch means operable, after entry of ordinal values into the value stages, for supplying an operating pulse to the carry stages to (1) activate the carry circuit associated with any operated carry stage, and (2) convert any operated carry stage to its non-operated condition; and second switch means operable, after said entry of ordinal values and before said operation of the first switch means, to disable activation of the carry circuit associated with any unoperated carry stage and to enable activation of the carry circuit associated with any operated carry stage.

23. In a calculating machine adapted for selective additive or subtractive operation, the combination of: a relay having a coil, a main armature and a control armature, both of said armatures being disposed in cooperative relationship with said coil; a pair of normally closed main contacts; a pair of normally open main contacts; a pair of normally closed control contacts; means effective in response to operation of the main armature for opening the normally closed main contacts and for closing the normally open main contacts; means effective in response to operation of the control armature for opening the normally closed control contacts; an energizing input for said coil; a first energization circuit for said coil for connecting the energizing input to ground through the coil and the normally closed main contacts; means effective in response to a first energization of the coil for operating both of said armatures; means effective in response to termination of said first energization for maintaining the main armature in its operated condition and for returning the control armature to its unoperated condition; a carry output circuit; a second energization circuit for said coil, established in response to termination of said first energization, for connecting the energizing input to the carry output circuit through the coil, the normally open main contacts and the normally closed control contacts; and selectively operable subtraction control means for: (1) breaking the circuit from the normally closed main contacts to ground, (2) breaking the circuit from the normally closed control contacts to the carry output circuit, (3) establishing a circuit from the normally closed main contacts to the carry output circuit, and (4) establishing a circuit from the normally closed control contacts to ground.

24. In a calculating machine register having a plurality of stages of binary value receiving devices, wherein the ten lowest stages are employed to register the binary equivalents of the values in the three lowest orders of the decimal system, and the eleventh and higher stages are employed to register the binary equivalents of the values in the fourth and higher orders of the decimal system; the combination of: means for entering binary values into said stages; binary carry means interconnecting the successive stages for normally performing additive carry to cause said values to be entered additively; selectively operable means for conditioning the carry means for subtractive carry to cause said values to be entered subtractively; means for sensing the values standing in the eleventh and higher stages; and means controlled by the sensing means and operable during a subtractive entry in response to a unit change in the value standing in the $(10+n)$th stage for subtractively entering into the ten lowest stages the binary equivalent of the decimal value $(2^{n-1})$ $(24)$, where $n$ is a positive integer greater than 0.

25. Where each of the letters $p$, $q$, $r$, R and $n$ represents an integral positive value greater than 0, a calculating machine register having a plurality of stages of value receiving devices operable in a number system based on a radix $r$, wherein the $p$ lowest stages are employed to register the values expressed in the radix $r$ system which are equivalents of the values in the $q$ lowest orders of a number system based on a radix R, and wherein the $(p+1)$st and higher stages are employed to register the equivalents in the radix $r$ system of the values in the $(q+1)$st and higher orders of the radix R system; in combination with: means for entering values expressed in the radix $r$ system into said stages; carry means interconnecting the successive stages for normally performing additive carry operations in the radix $r$ system to cause said values to be entered additively; selectively operable means for conditioning the carry means for subtractive carry operations in the radix $r$ system to cause said values to be entered subtractively; means for sensing the values standing in the $(p+1)$st and higher stages; and means controlled by the sensing means and operable in response to a unit change in the value standing in the $(p+n)$th stage during a subtractive entry for subtractively entering into the $p$ lowest stages of the register the value $(r^{n-1})$ $(r^p - R^q)$, expressed in the radix $r$ system.

26. A multiplying device comprising, a member having thereon a first ordinally arranged pattern of conductive surface elements representing a series of plural order multiplicands, and a second ordinally arranged pattern of conductive surface elements representing a series of plural order products, means correlating said first and second patterns, a first ordinally arranged sensing means positioned along said member for sequentially sensing the conductive surface elements in the first pattern, a second ordinally arranged sensing means positioned along said member for sequentially sensing the conductive surface elements in the second pattern, means for establishing an ordinal relationship between the second sensing means and the second pattern to represent a multiplier value, a multiplicand register, means for selectively entering a multiplicand into said register, a product register, means for detecting coincidence between the multiplicand value entered into the multiplicand register and the multiplicand representing pattern of conductive surface elements sensed by the first sensing means, and means including (1) interconnections between the second sensing means and the product register, and (2) said correlating means, and operable in response to the detection of said coincidence for entering into the product register the product of the sensed multiplicand and said multiplier.

27. In a binary register having: a series of binary value stages, each of said value stages having two conditions of operation representing, respectively, the absence and presence of a value and being operable upon receipt of a value pulse to reverse its condition of operation; and means for introducing value pulses into said series of stages; the combination of: a respective ordinal carry stage corresponding to each value stage; means operable upon the receipt of a value pulse in any value stage, when said value stage is in a predetermined one of its two conditions, to operate the corresponding carry stage and thereby store a carry value; a normally disabled carry circuit interconnecting each carry stage to the higher-order value stages and effective, upon being enabled, to immediately reverse the condition of each higher-order value stage up to and including the closet higher-order value stage which is not in said predetermined condition; means operable, after entry of ordinal values into the value stages, for supplying an operating pulse to the carry stages to (1) enable the carry circuit associated with any operated carry stage, and (2) convert any operated carry stage to its non-operated condition; and means operable to condition the ordinal value stages for either additive or subtractive entry of values, said last named means comprising switch means operable in one position to transmit a value pulse applied to an ordinal value stage in the no-value condition to ground and operable in a second position to transmit a value pulse applied to an ordinal value stage in the no-value condition to the carry stage associated therewith to operate said last named carry stage and thereby store a subtractive carry.

28. In a binary register having: a series of binary value stages, each of said value stages having two conditions of operation representing, respectively, the absence and presence of a value and being operable upon receipt of a value pulse to reverse its condition of operation; and means for introducing value pulses into said series of stages; the combination of: a respective ordinal carry stage corresponding to each value stage; means operable upon the receipt of a value pulse in any value stage, when said value stage is in a predetermined one of its two conditions, to operate the corresponding carry stage and thereby store a carry value; a normally disabled carry circuit interconnecting each carry stage to the next-higher-order value stage and effective, upon being enabled, to immediately transmit to said next-higher-order value stage a signal for reversing the condition of the latter stage; means interconnecting the value stages for transmitting to the next-higher-order value stage a carry signal from each value stage which is in said predetermined condition when it receives a carry signal; means operable, after entry of ordinal values into the value stages, for supplying an operating pulse to the carry stages to (1) enable the carry circuit associated with any operated carry stage, and (2) convert any operated carry stage to its non-operated condition; and means operable to condition the ordinal value stages for either additive or subtractive entry of values, said last named means comprising switch means operable in one position to transmit a value pulse applied to an ordinal value stage in the no-value condition to ground and operable in a second position to transmit a value pulse applied to an ordinal value stage in the no-value condition to the carry stage associated therewith to operate said last named carry stage and thereby store a subtractive carry value.

29. In a binary system calculator, the combination of first, second and third binary value registering means each having a plurality of value entry units representative of a series of sequential binary orders, and means interconnecting said registering means to enable the division of a binary value in said first means by a binary value in said second means to obtain a binary value quotient in said third means, said interconnecting means comprising: a selectively positionable member; sensing means for each of the value entry units of said first registering means in physical contact with said member; sensing means for each of the value entry units of said second registering means in physical contact with said member in spaced relation to said first sensing means; a pattern of conductive surface elements carried by said member in sensing relation with the sensing means for said first and second registering means, said elements arranged to connect the highest operated value entry unit of said second registering means with the highest operated value entry unit of said first registering means and to connect successively lower units of said second registering means with the correspondingly lower units of said first registering means upon selective positioning of said member; other sensing means operable in timed relationship to the selective positioning of said member to enter a quotient value into said third registering means; and means forming an operable connection between said first and second value registering means operable to subtract the value in said second registering means from the value in said first registering means.

30. In a calculator, the combination of a selectively positionable drum; first and second value registering means associated with said drum and having sensing fingers in spaced wiping relation with said drum; a third value registering means; and means so inter-relating said first, second and third value registering means as to enable the division of a value in said first registering means by a value in said second registering means to obtain a quotient in said third registering means, said inter-relating means comprising: a sensing pattern carried by said drum and having a plurality of spaced electrical contact strips operable upon the selective positioning of said member to electrically relate the highest operated order unit of said second registering means with the highest operated order unit of said first registering means; sensing means operable in timed relationship to the selective positioning of said drum to enter a quotient value in said third registering means; and means forming an electrical connection between said first and second registering means operable to subtract the value in said second registering means from the value in said first registering means.

31. A binary value calculator comprising first, second and third banks of counter units, there being a unit in each bank for each of a series of sequential binary orders, and each unit embodying means indicative in one state of a no-value condition for said unit and in another state of a value condition; value entry means for each of said first, second and third banks of counter units; selectively movable calculator means forming a variable interconnection between said banks of units adapted to so relate the values in said banks that the final values in said first and second banks are factorial binary values of the value in said third bank, said calculator means including: a pattern forming an interconnection between said second and third banks embodying contact strips providing for selective value relating and value transmitting connection between any given unit of said second bank and any given unit of said third bank in accordance with the positioning of said pattern; control means including means associated with said first bank adapted in one condition of operation to multiply the value in said second bank by the value in said first bank, the product value being introduced through said pattern into said third bank, and adapted in another condition of operation to divide the value in said third bank by the value in said second bank to provide a quotient value in said first bank; and means associated with at least the units of said third bank enabling the carry of values from one operated unit to the next higher unit upon the input of another value to said operated unit.

32. For the selective performance of division or multiplication in the binary system, a calculating machine comprising a rotatable drum member; a first group of binary order value recording units having contact means positioned longitudinally along said member and in linear sensing relation circumferentially of said member; a second group of binary order value recording units having contact means positioned longitudinally along said member and in linear sensing relation circumferentially of said member and in spaced relation to the contact means of said first group; and a sensing pattern of conductive surface elements carried on said member and comprising a plurality of spaced contact strips in sensing relation with said member and adapting said member in a single rotation to contactually relate in sequence the order value units of said first group with the order value units of said second group, beginning with the contactual relation of the lowest order unit of said first group with the highest order unit of said second group and continuing through the relation of the lowest order unit of said first group with the lowest order unit of said second group.

(References on following page)

References Cited in the file of this patent

UNITED STATES PATENTS

| | | | |
|---|---|---|---|
| 1,880,523 | Tauschek | Oct. 4, | 1932 |
| 2,176,932 | Smith | Oct. 24, | 1939 |
| 2,386,481 | Lang | Oct. 9, | 1945 |
| 2,394,924 | Luhn | Feb. 12, | 1946 |
| 2,394,925 | Luhn | Feb. 12, | 1946 |
| 2,404,047 | Flory et al. | July 16, | 1946 |
| 2,462,275 | Morton et al. | Feb. 22, | 1949 |
| 2,486,809 | Stibitz | Nov. 1, | 1949 |
| 2,489,325 | Ridler | Nov. 29, | 1949 |
| 2,500,294 | Phelps | Mar. 14, | 1950 |
| 2,539,623 | Heising | Jan. 30, | 1951 |
| 2,540,654 | Cohen | Feb. 6, | 1951 |
| 2,552,781 | Hadfield | May 15, | 1951 |
| 2,585,630 | Crosman | Feb. 12, | 1952 |
| 2,587,532 | Schmidt | Feb. 26, | 1952 |
| 2,601,281 | Hartley | June 24, | 1952 |
| 2,604,262 | Phelps | July 22, | 1952 |
| 2,624,507 | Phelps | Jan. 6, | 1953 |
| 2,658,670 | Morton | Nov. 10, | 1953 |
| 2,668,661 | Stibitz | Feb. 9, | 1954 |
| 2,672,283 | Havens | Mar. 16, | 1954 |
| 2,737,342 | Nelson | Mar. 6, | 1956 |

OTHER REFERENCES

Second Interim Progress Report, July 1947, On the Physical Realization of an Electronic Computing Instrument; by Institute of Advanced Study (IAS), pages 32A to 34A, 35 to 37A.

Third Interim Progress Report, Jan. 1, 1948, On the Physical Realization of an Electronic Computing Instrument; by Institute of Advanced Study (IAS) pages 53 to 59.

Progress Report 2 on the EDVAC, Moore School of Electric Engineering Univ. of Pennsylvania, June 30, 1946, declassified Feb. 13, 1947, pages 4–20 to 4–30.

The Logical Design of the Raytheon Computer, Bloch et al., Mathematical Tables, October 1948, page 290 is relied upon.

"A Digital Computer for Scientific Applications," West and De Turk, Proc., of I. R. E., December 1948, Fig. 11, page 1457.